(12) United States Patent
Hiratsuka

(10) Patent No.: US 11,816,191 B2
(45) Date of Patent: Nov. 14, 2023

(54) INFORMATION PROCESSING APPARATUS, INFORMATION PROCESSING METHOD, ELECTRONIC DEVICE, AND INFORMATION PROCESSING SYSTEM FOR PERIOD MANAGEMENT OF A LICENSE USED IN THE ELECTRONIC DEVICE

(71) Applicant: SONY CORPORATION, Tokyo (JP)

(72) Inventor: Yosuke Hiratsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 441 days.

(21) Appl. No.: 16/967,225

(22) PCT Filed: Jan. 30, 2019

(86) PCT No.: PCT/JP2019/003054
§ 371 (c)(1),
(2) Date: Aug. 4, 2020

(87) PCT Pub. No.: WO2019/159688
PCT Pub. Date: Aug. 22, 2019

(65) Prior Publication Data
US 2021/0081514 A1  Mar. 18, 2021

(30) Foreign Application Priority Data
Feb. 13, 2018 (JP) ................. 2018-022803

(51) Int. Cl.
*G06F 21/10* (2013.01)
*H04L 9/08* (2006.01)
*H04L 9/32* (2006.01)

(52) U.S. Cl.
CPC .......... *G06F 21/105* (2013.01); *H04L 9/0819* (2013.01); *H04L 9/3236* (2013.01); *G06F 2221/0768* (2013.01)

(58) Field of Classification Search
CPC .......... G06F 21/105; G06F 2221/0768; H04L 9/0819; H04L 9/3236
(Continued)

(56) References Cited

U.S. PATENT DOCUMENTS 7,171,662 B1 * 1/2007 Misra ................. G06Q 30/0633
717/176
2002/0174356 A1 * 11/2002 Padole .................... G06F 21/10
726/26

(Continued)

FOREIGN PATENT DOCUMENTS

AU  2010247992 A1  10/2011
BR  PI1009911 A2  3/2016

(Continued)

OTHER PUBLICATIONS

International Search Report and Written Opinion of PCT Application No. PCT/JP2019/003054, dated Apr. 23, 2019, 10 pages of ISRWO.

(Continued)

*Primary Examiner* — Bryan F Wright
(74) *Attorney, Agent, or Firm* — CHIP LAW GROUP

(57) ABSTRACT

Provided is a system capable of appropriately performing period management of a license provided by an information processing apparatus. The information processing apparatus includes a data generation unit that generates first license communication information using first device information, the first device information being information including a first reference date and time and a device unique key, the first reference date and time being a date and time set using a hardware clock of an electronic device and being a date and time used for period management of a license, the device unique key being a key unique to the electronic device, and the first license communication information being information including at least one of an effective term or an (Continued)

expiration time of the license and the first reference date and time and used for installing the license in the electronic device.

27 Claims, 19 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2003/0084306 A1* | 5/2003 | Abburi | G06F 21/10 |
| | | | 713/188 |
| 2003/0195855 A1* | 10/2003 | Parks | G11B 20/00115 |
| | | | 705/51 |
| 2005/0022025 A1* | 1/2005 | Hug | G06F 21/10 |
| | | | 726/4 |
| 2005/0102237 A1 | 5/2005 | Wakimoto | |
| 2009/0254482 A1 | 10/2009 | Vadlamani et al. | |
| 2010/0293103 A1 | 11/2010 | Nikitin et al. | |
| 2018/0232503 A1* | 8/2018 | Tsuboi | G06F 21/121 |
| 2020/0394284 A1* | 12/2020 | Hiratsuka | H04L 9/3242 |

FOREIGN PATENT DOCUMENTS

| | | |
|---|---|---|
| CA | 2758291 A1 | 11/2010 |
| CN | 1617153 A | 5/2005 |
| CN | 101983381 A | 3/2011 |
| CN | 102422295 A | 4/2012 |
| EP | 2263167 A1 | 12/2010 |
| EP | 2430586 A2 | 3/2012 |
| JP | 11-031131 A | 2/1999 |
| JP | 2005-141683 A | 6/2005 |
| JP | 2006-127349 A | 5/2006 |
| JP | 2011-087794 A | 5/2011 |
| JP | 2013-131015 A | 7/2013 |
| JP | 5597253 B2 | 10/2014 |
| KR | 10-2012-0017035 A | 2/2012 |
| RU | 2011-145978 A | 5/2013 |
| TW | 201040782 A | 11/2010 |
| WO | 2009/126368 A1 | 10/2009 |
| WO | 2010/132228 A2 | 11/2010 |

OTHER PUBLICATIONS

Extended European Search Report of EP Application No. 19754534.6, dated Jan. 18, 2021, 09 pages.

* cited by examiner

FIG. 9

DEVICE INFORMATION FILE
HAS BEEN WRITTEN OUT

PLEASE UPLOAD DEVICE
INFORMATION FILE
ACQUIRED FROM CAMERA

UPLOAD

CAMERA:XXX-XXX-XXXXXX
DO YOU WANT TO INSTALL
LICENSE IN THIS DEVICE?

INSTALL

PLEASE DOWNLOAD LICENSE
COMMUNICATION FILE, STORE LICENSE
COMMUNICATION FILE IN MEDIUM,
AND INSERT MEDIUM INTO CAMERA

DOWNLOAD

| FUNCTION ID | SYSTEM UNIQUE INFORMATION | DEVICE UNIQUE ID | | EFFECTIVE TERM | |

FIG. 14B

| FUNCTION ID | SYSTEM UNIQUE INFORMATION | DEVICE UNIQUE ID | | EXPIRATION TIME | |

FIG. 14C

| FUNCTION ID | SYSTEM UNIQUE INFORMATION | DEVICE UNIQUE ID | | EXPIRATION TIME | EFFECTIVE TERM | |

CANCEL INSTALLATION AND PERFORM
RE-ISSUANCE OF INSTALLATION KEY
XXXXXXX-4K-1W

RE-ISSUE

INSTALLATION HAS BEEN CANCELED.
PLEASE INSTALL LICENSE AGAIN.

OK

INFORMATION PROCESSING APPARATUS, INFORMATION PROCESSING METHOD, ELECTRONIC DEVICE, AND INFORMATION PROCESSING SYSTEM FOR PERIOD MANAGEMENT OF A LICENSE USED IN THE ELECTRONIC DEVICE

CROSS REFERENCE TO RELATED APPLICATIONS

This application is a U.S. National Phase of International Patent Application No. PCT/JP2019/003054 filed on Jan. 30, 2019, which claims priority benefit of Japanese Patent Application No. JP 2018-022803 filed in the Japan Patent Office on Feb. 13, 2018. Each of the above-referenced applications is hereby incorporated herein by reference in its entirety.

TECHNICAL FIELD

The present technology relates to an information processing apparatus, an information processing method, a program, an electronic device, and an information processing system, and more particularly, to an information processing apparatus, an information processing method, a program, an electronic device, and an information processing system that are suitable for being used in a case where a license provided by the information processing apparatus is used in the electronic device that does not directly communicate with the information processing apparatus.

BACKGROUND ART

Conventionally, it has been proposed to manage an expiration time of encapsulated software (hereinafter, referred to as a capsule) provided from a server, using an integrated chip (IC) card (see, for example, Patent Document 1).

Specifically, a personal computer (PC) transmits expiration time authentication data including an expiration time start time and an expiration time end time to the IC card at the time of start-up of the capsule. In a case where an IC card time is before the expiration time start time, the IC card rewrites the IC card time to the expiration time start time. Furthermore, the IC card permits the use of the capsule in a case where the IC card time is before the expiration time end time, and does not permit the use of the capsule in a case where the IC card time is after the expiration time end time. Therefore, period management of the capsule can be performed offline without connecting the PC to the server.

CITATION LIST

Patent Document

Patent Document 1: Japanese Patent Application Laid-Open No. 2011-87794

SUMMARY OF THE INVENTION

Problems to be Solved by the Invention

However, in the invention described in Patent Document 1, for example, in a case where the IC card time before being rewritten is not accurate, period management of a license cannot be appropriately performed. For example, when the IC card time proceeds, the capsule may be unusable even though an actual time is before the expiration time end time. Furthermore, when the IC card time is delayed, the capsule may be usable even though the actual time has passed the expiration time end time.

The present technology has been made in view of such a situation, and is to appropriately perform period management of a license provided by an information processing apparatus such as a server or the like in a case where the license is used in an electronic device that does not directly communicate with the information processing apparatus.

Solutions to Problems

An information processing apparatus according to a first aspect of the present technology includes: a data generation unit that generates first license communication information using first device information, the first device information being information including a first reference date and time and a device unique key, the first reference date and time being a date and time set using a hardware clock of an electronic device and being a date and time used for period management of a license, the device unique key being a key unique to the electronic device, and the first license communication information being information including at least one of an effective term or an expiration time of the license and the first reference date and time and used for installing the license in the electronic device.

An information processing method according to a first aspect of the present technology includes: generating, by an information processing apparatus, license communication information using device information, the device information being information including a reference date and time and a device unique key, the reference date and time being a date and time set using a hardware clock of an electronic device and being a date and time used for period management of a license, the device unique key being a key unique to the electronic device, and the license communication information being information including at least one of an effective term or an expiration time of the license and the reference date and time and used for installing the license in the electronic device.

A program according to a first aspect of the present technology causes a computer to execute processing for: generating license communication information using device information, the device information being information including a reference date and time and a device unique key, the reference date and time being a date and time set using a hardware clock of an electronic device and being a date and time used for period management of a license, the device unique key being a key unique to the electronic device, and the license communication information being information including at least one of an effective term or an expiration time of the license and the reference date and time and used for installing the license in the electronic device.

An electronic device according to a second aspect of the present technology includes: a hardware clock; and a data generation unit that generates first device information that is information including a first reference date and time and a device unique key and used for issuing a license in a first information processing apparatus, the first reference date and time being a date and time set using the hardware clock and being a date and time used for period management of the license provided by the first information processing apparatus, and the device unique key being a key unique to every device.

An information processing method according to a second aspect of the present technology includes: generating, by an electronic device including a hardware clock, device information that is information including a reference date and time and a device unique key and used for issuing a license in an information processing apparatus, the reference date and time being a date and time set using the hardware clock and being a date and time used for period management of the license provided by the information processing apparatus, and the device unique key being a key unique to the electronic device.

A program according to a second aspect of the present technology causes a computer of an electronic device including a hardware clock to execute processing for: generating device information that is information including a reference date and time and a device unique key and used for issuing a license in an information processing apparatus, the reference date and time being a date and time set using the hardware clock and being a date and time used for period management of the license provided by the information processing apparatus, and the device unique key being a key unique to the electronic device.

An information processing system according to a third aspect of the present technology includes: an electronic device that includes a hardware clock; a first information processing apparatus; and a second information processing apparatus, in which the electronic device generates device information that is information including a reference date and time and a device unique key, the reference date and time being a date and time set using the hardware clock and a date and time used for period management of a license, and the device unique key being a key unique to the electronic device, the first information processing apparatus transmits the device information to the second information processing apparatus, the second information processing apparatus receives the device information from the first information processing apparatus, generates license communication information that is information including at least one of an effective term or an expiration time of the license and the reference date and time using the device information, and transmits the license communication information to the first information processing apparatus, the first information processing apparatus receives the license communication information from the second information processing apparatus, and the electronic device installs the license using the license communication information.

In the first aspect of the present technology, the license communication information is generated using the device information, the device information being the information including the reference date and time and the device unique key, the reference date and time being the date and time set using the hardware clock of the electronic device and being the date and time used for the period management of the license, the device unique key being the key unique to the electronic device, and the license communication information being the information including at least one of the effective term or the expiration time of the license and the reference date and time and used for installing the license in the electronic device.

In the second aspect of the present technology, the device information that is the information including the reference date and time and the device unique key and used for issuing the license in the information processing apparatus is generated, the reference date and time being the date and time set using the hardware clock and being the date and time used for the period management of the license provided by the information processing apparatus, and the device unique key being the key unique to the electronic device.

In the third aspect of the present technology, the device information that is the information including the reference date and time and the device unique key is generated by the electronic device, the reference date and time being the date and time set using the hardware clock and the date and time used for the period management of the license, and the device unique key being the key unique to the electronic device; the device information is transmitted to the second information processing apparatus by the first information processing apparatus; the device information is received from the first information processing apparatus by the second information processing apparatus, the license communication information that is the information including at least one of the effective term or the expiration time of the license and the reference date and time is generated using the device information, and the license communication information is transmitted to the first information processing apparatus by the second information processing apparatus; the license communication information is received from the second information processing apparatus by the first information processing apparatus; and the license is installed using the license communication information by the electronic device.

Effects of the Invention

According to the first to third aspects of the present technology, the license provided by the information processing apparatus can be used in the electronic device. Furthermore, according to the first to third aspects of the present technology, it is possible to appropriately perform period management of a license provided by an information processing apparatus in a case where the license is used in an electronic device that does not directly communicate with the information processing apparatus.

Note that an effect described here is not necessarily limited, and may be any effect described in the present disclosure.

BRIEF DESCRIPTION OF DRAWINGS

FIG. 9 is a diagram illustrating an example of a screen of an electronic device.

FIG. 10 is a diagram illustrating an example of a screen of the PC.

FIG. 11 is a diagram illustrating an example of a screen of the PC.

FIG. 12 is a diagram illustrating an example of a screen of the PC.

FIGS. 14A, 14B, and 14C are diagrams illustrating a format example of an installation key.

MODE FOR CARRYING OUT THE INVENTION

Hereinafter, an embodiment for carrying out the present technology will be described. A description will be given in the following order.
1. Embodiment
2. Modification
3. Others 1. Embodiment First, an embodiment of the present technology will be described with reference to FIGS. 1, 2, 3, 4, 5, 6, 7, 8, 9, 10, 11, 12, 13, 14A, 14B, 14C, 15, 16, 17, 18, 19, 20, 21, 22, 23, and 24.

<Configuration Example of Information Processing System 10>

Figure 1:
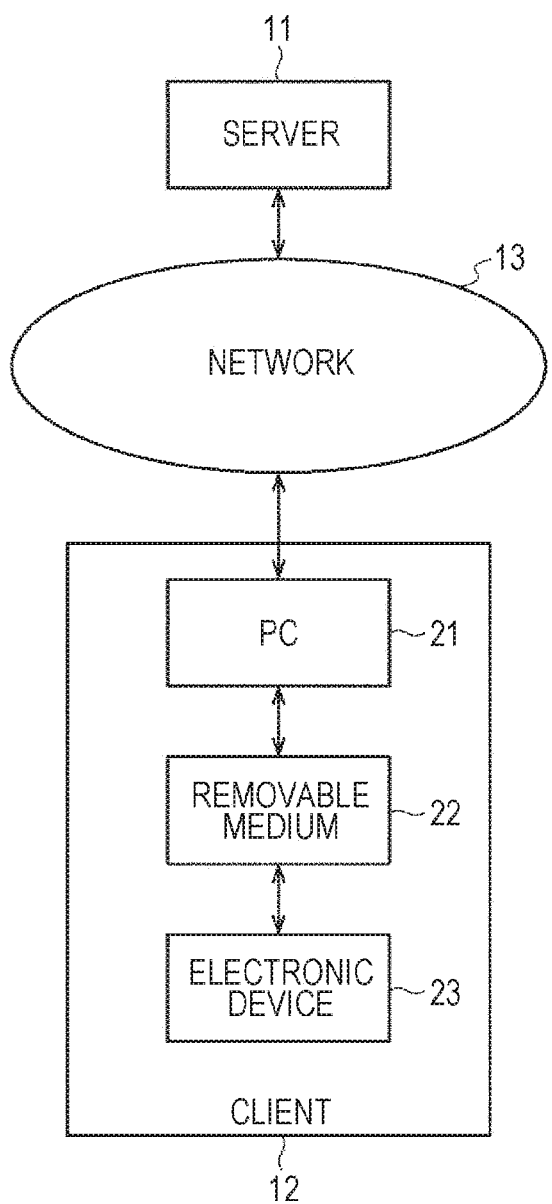
FIG. 1 is a block diagram illustrating an embodiment of an information processing system to which the present technology is applied.

FIG. 1 illustrates a configuration example of an information processing system 10 to which the present technology is applied.

The information processing system 10 includes a server 11, a client 12, and a network 13. The client 12 includes a personal computer (PC) 21, a removable medium 22, and an electronic device 23.

The server 11 and the PC 21 are connected to each other and communicate with each other, via the network 13.

The server 11 performs provision and management of a license of a function used in the electronic device 23, provision of software for realizing the function of the electronic device 23, and the like.

The PC 21 exchanges various data with the server 11 by communicating with the server 11 via the network 13. For example, the PC 21 receives data regarding the license of the function used in the electronic device 23 and various data such as software and the like used in the electronic device 23, from the server 11. Furthermore, the PC 21 transmits various data such as data and the like regarding the electronic device 23 to the server 11.

The removable medium 22 includes a magnetic disk, an optical disk, a magneto-optical disk, a semiconductor memory, or the like, and is used to exchange various data between the PC 21 and the electronic device 23.

Note that the removable medium 22 will hereinafter be simply referred to as a medium 22.

The electronic device 23 is difficult to connect to the network 13, basically does not directly communicate with the server 11, and is used offline. Furthermore, the electronic device 23 can use a function corresponding to the installed license by installing the license provided from the server 11 via the medium 22.

Note that a type of the electronic device 23 is not particularly limited. Hereinafter, a case where the electronic device 23 is a camera will be mainly described by way of example.

Furthermore, a type of a function that becomes a target of the license provided by the server 11 is not particularly limited. For example, the function may not be necessarily a function using software, and may be a function realized only by hardware.

Moreover, the server 11 may also provide software for realizing the function that becomes the target of the license. In this case, the license of the function is also a license of the software for realizing the function.

Furthermore, only one client 12 has been illustrated in FIG. 1 for making it easy to understand the drawing and the description, but a plurality of clients 12 is actually provided. Moreover, only one server 11 has also been illustrated, but a plurality of servers 11 may be provided. Furthermore, the number of at least one of the PC 21, the medium 22, or the electronic device 23 included in one client 12 may be plural.

<Configuration Example of Server 11>

Figure 2:
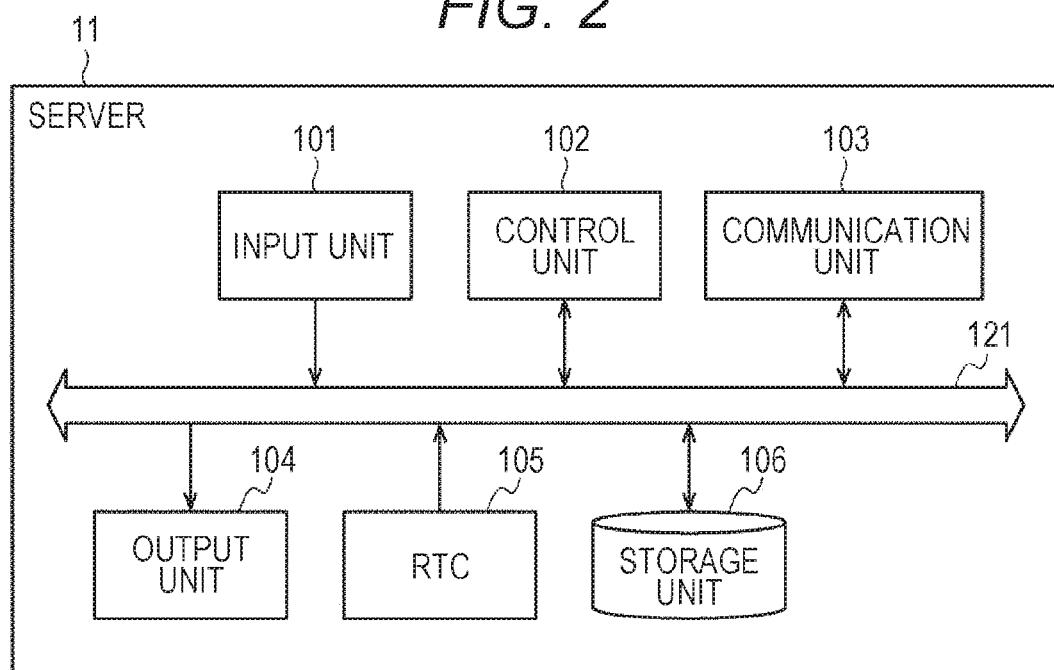
FIG. 2 is a block diagram illustrating a configuration example of a server.

FIG. 2 illustrates a configuration example of the server 11.

The server 11 includes an input unit 101, a control unit 102, a communication unit 103, an output unit 104, a real time clock (RTC) 105, and a storage unit 106. The input unit 101, the control unit 102, the communication unit 103, the output unit 104, the RTC 105, and the storage unit 106 are connected to each other via a bus 121.

The input unit 101 includes, for example, input devices such as a switch, a button, a key, a microphone, an imaging element, and the like, and is used to input various data. The input unit 101 supplies the input data to each unit of the server 11 via the bus 121.

The control unit 102 includes, for example, a processor such as a central processing unit (CPU) and the like, and controls processing of each unit of the server 11.

The communication unit 103 includes, for example, a communication device and the like, and communicates with the PC 21 via the network 13. Note that a communication manner of the communication unit 103 is not particularly limited, and may be any one of a wired communication manner or a wireless communication manner. Furthermore, for example, the communication unit 103 may correspond to a plurality of communication manners.

The output unit 104 includes, for example, output devices such as a display, a speaker, a lighting device, a vibrator, and the like, and outputs various data by an image, a sound, light, vibrations, and the like.

The RTC 105 is a hardware clock that continues to operate by a backup battery (not illustrated) and the like even though a power supply of the server 11 is turned off. The RTC 105 is managed so that a user cannot change the date and time (a date and a time).

The storage unit 106 includes at least a non-volatile storage medium, and stores various data or software necessary for processing of the server 11.

Note that, hereinafter, in a case where the respective units of the server 11 exchange data and the like with each other via the bus 121, a description of the bus 121 will be appropriately omitted. For example, in a case where the control unit 102 and the communication unit 103 exchange data with each other via the bus 121, it is simply said that the control unit 102 and the communication unit 103 exchange data with each other.

<Configuration Example of Function of Control Unit 102>

Figure 3:
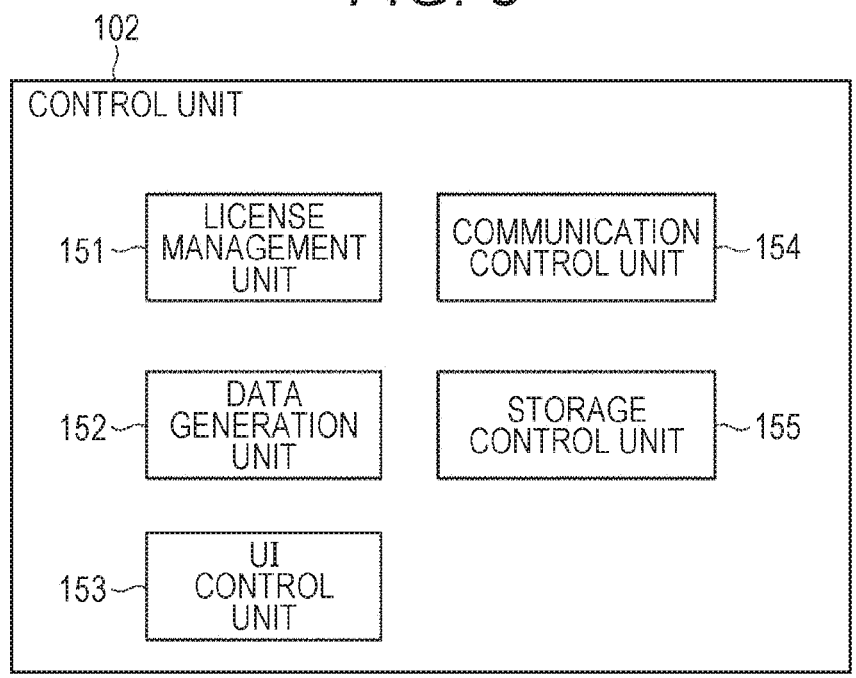
FIG. 3 is a block diagram illustrating a configuration example of a function of a control unit of the server.

FIG. 3 illustrates a configuration example of a function of the control unit 102 of the server 11. The control unit 102 realizes a function including a license management unit 151, a data generation unit 152, a user interface (UI) control unit 153, a communication control unit 154, and a storage control unit 155 by executing, for example, a control program.

The license management unit 151 manages a license of a function used in the electronic device 23.

The data generation unit 152 generates various data to be transmitted to the PC 21.

The UI control unit 153 controls user interfaces in the PC 21 and the electronic device 23. For example, the UI control unit 153 controls a user interface in the PC 21 by generating a display control file for displaying various information on a screen of the PC 21 and transmitting the display control file to the PC 21.

The communication control unit 154 controls communication processing by the communication unit 103. Furthermore, the communication control unit 154 also acquires data to be transmitted to the PC 21 from each unit of the server 11 or supplies data received from the PC 21 to each unit of the server 11.

The storage control unit 155 controls the storage unit 106 to store data and the like regarding the license of the function used in the electronic device 23.

<Configuration Example of Electronic Device 23>

Figure 4:
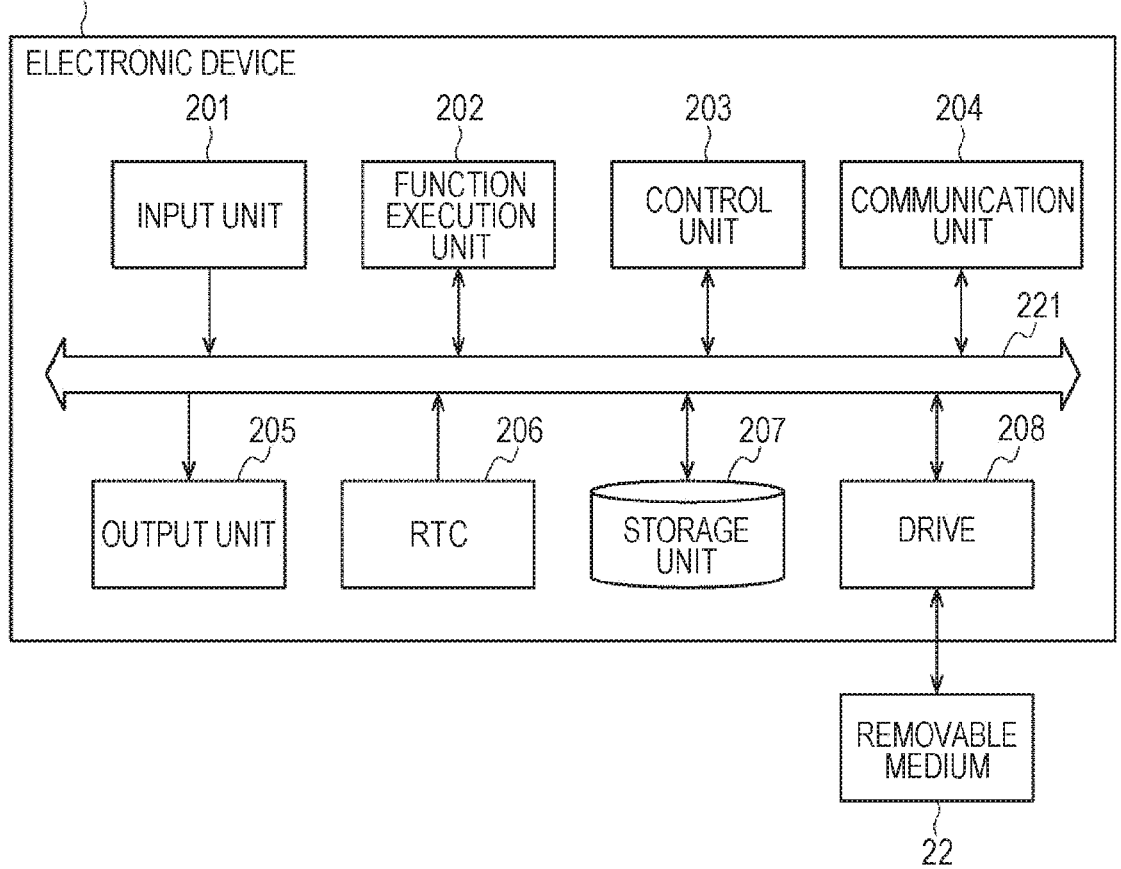
FIG. 4 is a block diagram illustrating a configuration example of an electronic device.

FIG. 4 illustrates a configuration example of the electronic device 23.

The electronic device 23 includes an input unit 201, a function execution unit 202, a control unit 203, a communication unit 204, an output unit 205, a real time clock (RTC) 206, a storage unit 207, and a drive 208. The input unit 201, the function execution unit 202, the control unit 203, the communication unit 204, the output unit 205, the RTC 206, the storage unit 207, and the drive 208 are connected to each other via a bus 221.

The input unit 201 includes, for example, input devices such as a switch, a button, a key, a microphone, an imaging element, and the like, and is used to input various data. The input unit 201 supplies the input data to each unit of the electronic device 23 via the bus 221.

The function execution unit 202 includes various hardware and software for executing the function of the electronic device 23. For example, in a case where the electronic device 23 is a camera, the function execution unit 202 includes a lens, an imaging element, and the like.

The control unit 203 includes, for example, a processor such as a central processing unit (CPU) and the like, and controls processing of each unit of the electronic device 23.

The communication unit 204 includes, for example, a communication device and the like, and communicates with another electronic device (not illustrated) (for example, a smartphone or the like). Note that a communication manner of the communication unit 204 is not particularly limited, and may be any one of a wired communication manner or a wireless communication manner. Furthermore, for example, the communication unit 204 may correspond to a plurality of communication manners.

The output unit 205 includes, for example, output devices such as a display, a speaker, a lighting device, a vibrator, and the like, and outputs various data by an image, a sound, light, vibrations, and the like.

The RTC 206 is a hardware clock that continues to operate by a backup battery and the like even though a power supply of the electronic device 23 is turned off. The RTC 206 is managed so that the user cannot change the date and time (a date and a time).

The storage unit 207 includes at least a non-volatile storage medium, and stores various data or software necessary for processing of the electronic device 23.

The drive 208 can attach and detach the medium 22, and drives the connected medium 22.

Note that, hereinafter, in a case where the respective units of the electronic device 23 exchange data and the like with each other via the bus 221, a description of the bus 221 will be appropriately omitted. For example, in a case where the control unit 203 and the communication unit 204 exchange data with each other via the bus 221, it is simply said that the control unit 203 and the communication unit 204 exchange data with each other.

<Configuration Example of Function of Control Unit 203>

Figure 5:
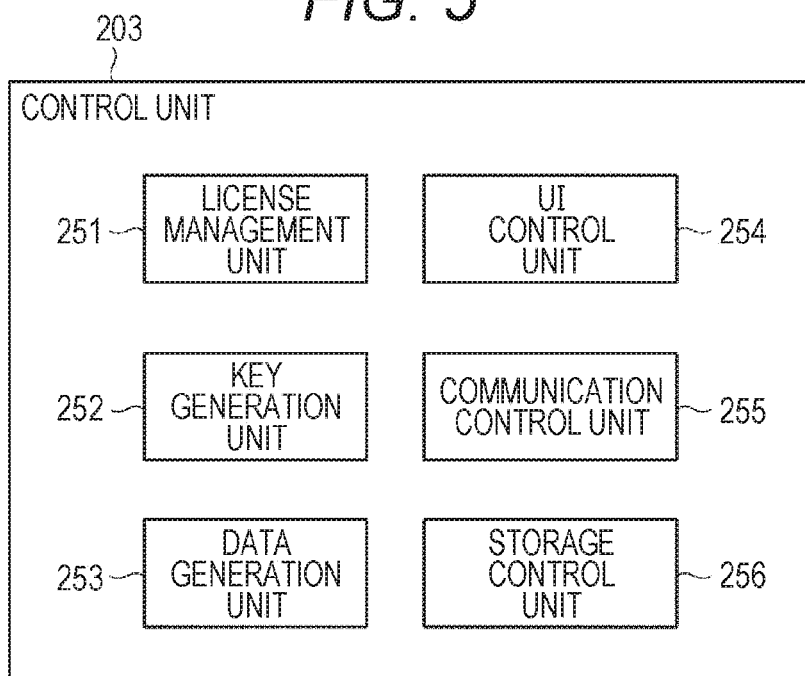
FIG. 5 is a block diagram illustrating a configuration example of a function of a control unit of the electronic device.

FIG. 5 illustrates a configuration example of a function of the control unit 203 of the electronic device 23. The control unit 203 realizes a function including a license management unit 251, a key generation unit 252, a data generation unit 253, a UI control unit 254, a communication control unit 255, and a storage control unit 256 by executing, for example, a control program.

The license management unit 251 manages the license of the function used in the electronic device 23.

The key generation unit 252 generates a device unique key, which is a unique secret key different for every electronic device 23.

The data generation unit 253 generates various data to be transmitted to the server 11 via the medium 22 and the PC 21.

The UI control unit 254 controls the output unit 205 to control a user interface in the electronic device 23.

The communication control unit 255 controls communication processing by the communication unit 204. Furthermore, the communication control unit 255 acquires data to be transmitted to the outside via the communication unit 204 from each unit of the electronic device 23 or supplies data received from the outside via the communication unit 204 to each unit of the electronic device 23.

The storage control unit 256 controls the storage unit 207 to store data and the like regarding the license of the function used in the electronic device 23.

<Processing of Information Processing System 10>

Next, processing of the information processing system 10 will be described with reference to FIGS. 6, 7, 8, 9, 10, 11, 12, 13, 14A, 14B, 14C, 15, 16, 17, 18, 19, 20, 21, 22, 23, and 24.

<License Acquisition Processing>

First, license acquisition processing executed by the client 12 will be described with reference to a flowchart of FIG. 6.

In step S1, the PC 21 requests a device information acquisition file.

Figure 7:
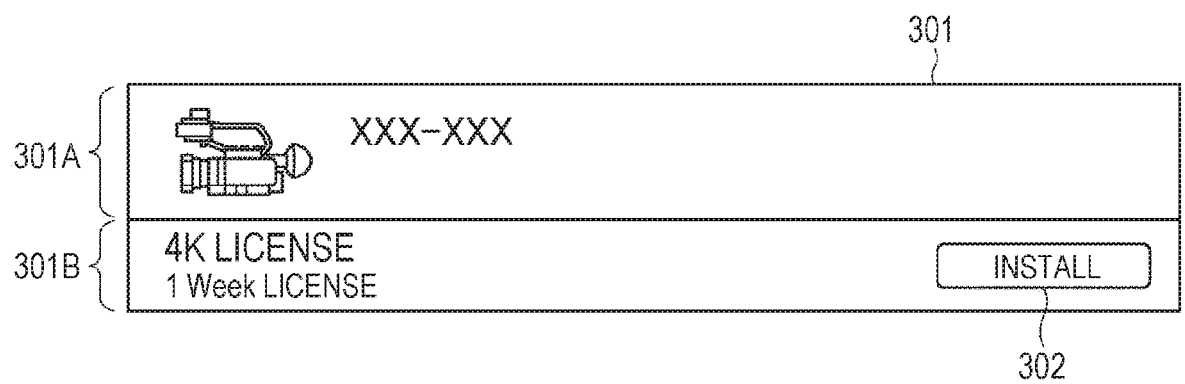
FIG. 7 is a diagram illustrating an example of a screen of a personal computer (PC).

For example, the PC 21 accesses the server 11 via the network 13 according to an operation of the user to display a screen for acquiring the license of the function used in the electronic device 23. For example, a window 301 of FIG. 7 is displayed on the screen of the PC 21.

The window 301 is divided into a device information field 301A and a license information field 301B.

At a left end of the device information field 301A, an image and a type name of the electronic device 23 are displayed laterally side by side.

At a left end of the license information field 301B, a function that becomes a target acquiring a license and a type of the license are shown. In this example, it is shown that a license of an imaging function of a 4K image during an effective term of one week is an acquisition target.

Note that the user sets at least one of an effective term or an expiration time of the license at the time of acquiring the license.

In a case where only one of the effective term or the expiration time is set, the start date and time of the license is not particularly set, and the license can be used from a point in time when the license is acquired. On the other hand, in a case where both of the effective term and the expiration time are set, the date and time obtained by subtracting the effective term from the expiration time is the start date and time of the license. Note that, for example, the setting of the expiration time and the effective term is limited so that the start date and time is after the current date and time.

Furthermore, the expiration time is set based on the RTC 105 of the server 11. However, as described later, the expiration time is converted into the date and time based on the RTC 206 of the electronic device 23 in the server 11, and is given in notification to the electronic device 23.

Note that, hereinafter, in a case of distinguishing between the expiration time based on the RTC 105 of the server 11 and the expiration time based on the RTC 206 of the electronic device 23, the former is referred to as a server expiration time and the latter is referred to as a client expiration time.

Figure 8:
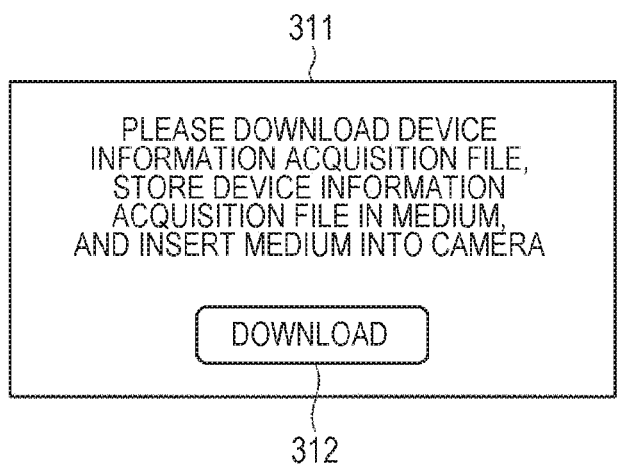
FIG. 8 is a diagram illustrating an example of a screen of the PC.

At a right end of the license information field 301B, an installation button 302 is displayed. When the installation button 302 is pressed, for example, a window 311 of FIG. 8 is displayed on the screen of the PC 21.

In the window 311, a message for prompting the user to download the device information acquisition file, store the device information acquisition file in the medium 22, and insert the medium 22 into the camera (electronic device 23) and a download button 312 are displayed. When the download button 312 is pressed, the PC 21 requests the server 11 to transmit the device information acquisition file, via the network 13.

In response to this request, the server 11 transmits the device information acquisition file to the PC 21 via the network 13 in step S31 of FIG. 13 as described later.

In step S2, the PC 21 receives the device information acquisition file transmitted from the server 11. Furthermore, the PC 21 stores the received device information acquisition file in the medium 22 according to, for example, an operation of the user.

In step S3, the electronic device 23 executes a command in the device information acquisition file.

Specifically, the user detaches the medium 22 in which the device information acquisition file is stored from the PC 21, and connects the medium 22 to the drive 208 of the electronic device 23.

The drive 208 reads the device information acquisition file stored in the medium 22 and supplies the read device information acquisition file to the control unit 203. The control unit 203 executes a device information acquisition command included in the device information acquisition file. Therefore, acquisition processing of device information is started.

Note that, for example, the processing of steps S1 to S3 may be omitted, and the acquisition processing of the device information may be started by operating the electronic device 23 by the user without using the device information acquisition command.

In step S4, the key generation unit 252 determines whether or not the device unique key has been generated. The key generation unit 252 determines that the device unique key has not been generated in a case where the device unique key is not stored in the storage unit 207, and the processing proceeds to step S5.

In step S5, the key generation unit 252 generates the device unique key. A generation method of the device unique key is not particularly limited. The storage control unit 256 causes the storage unit 207 to store the device unique key.

That is, the electronic device 23 generates the device unique key, which is a secret key unique to the electronic device 23, before generating a device information file for the first time after factory shipment. Therefore, it is not necessary to generate the device unique key at the time of the factory shipment and store the device unique key in the electronic device 23, such that a risk of leakage or the like of the device unique key is reduced. Furthermore, for example, by changing firmware of the electronic device 23, it is possible to change a generation method, a generation timing, or the like, of the device unique key, such that flexibility is improved.

Thereafter, the processing proceeds to step S6.

On the other hand, in step S4, the key generation unit 252 determines that the device unique key has been generated in a case where the device unique key is stored in the storage unit 207, the processing of step S5 is skipped, and the processing proceeds to step S6.

In step S6, the data generation unit 253 sets the current date and time of the RTC 206 as a device RTC. The device RTC is the date and time of the RTC 206 at the time of generating the device information file, and indicates the date and time of the RTC 206 of the electronic device 23 at the time of requesting the license. Furthermore, the device RTC is the reference date and time used for period management of a license to be acquired.

In step S7, the data generation unit 253 encrypts the device unique key with a server public key. Specifically, the data generation unit 253 reads the device unique key and the server public key from the storage unit 207. Note that the server public key is a public key corresponding to a server secret key possessed by the server 11, and is distributed to the electronic device 23 in advance. The data generation unit 253 encrypts the device unique key using the server public key. Therefore, security of the device unique key is ensured, such that tampering, eavesdropping, and the like, of the device unique key are prevented.

In step S8, the data generation unit 253 generates storage data including a device unique identification (ID), the device RTC, and the device unique key. Specifically, the data generation unit 253 reads the device unique ID from the storage unit 207. The device unique ID is an ID uniquely allocated to each electronic device 23, and includes, for example, a type name and a serial number of the electronic device 23. The data generation unit 253 generates storage data including the device unique ID, the device RTC, and the encrypted device unique key.

In step S9, the data generation unit 253 calculates a hash value of the storage data using the device unique key. Note that a hash function used to calculate the hash value is not particularly limited.

In step S10, the data generation unit 253 generates a device information file including the storage data and the hash value. Therefore, security of the storage data is ensured using the device unique key.

This device information file is used by the server 11 to issue a license as a license request file for requesting issuance of the license.

In step S11, the data generation unit 253 stores the device information file in the medium 22 via the drive 208.

At this time, for example, the output unit 205 displays a window 321 of FIG. 9 under the control of the UI control unit 254. In the window 321, a message for notifying the user that the device information file has been written out and an OK button 322 are displayed. When the OK button 322 is pressed, the window 321 is closed.

In step S12, the PC 21 transmits the device information file to the server 11.

For example, the user detaches the medium 22 from the electronic device 23, and connects the medium 22 to the PC 21. The PC 21 displays, for example, a window 331 of FIG. 10 on the screen.

In the window 331, a message for prompting the user to upload the device information file acquired from the camera (electronic device 23) and an upload button 332 are displayed. When the upload button 332 is pressed, the PC 21 reads the device information file from the medium 22 and transmits the read device information file to the server 11 via the network 13.

In response to this transmission, the server 11 receives the device information file in step S32 of FIG. 13 as described later.

In step S13, the PC 21 determines whether or not to acquire a license communication file.

The server 11 transmits a display control file for finally confirming execution of installation of the license via the network 13 in step S34 of FIG. 13 as described later, in a case where it is determined that the device information file received from the PC 21 is valid.

The PC 21 displays a window 341 of FIG. 11 on the screen on the basis of the display control file.

In the window 341, a device unique ID of the camera (electronic device 23), a message for confirming the execution of the installation of the license in the camera, and an installation button 342 are displayed. When the installation button 342 is pressed, for example, a window 351 of FIG. 12 is displayed on the screen of the PC 21.

In the window 351, a message for prompting the user to download the license communication file, store the license communication file in the medium 22, and insert the medium 22 into the camera (electronic device 23) and a download button 352 are displayed. Then, when the download button 352 is pressed, the PC 21 determines to acquire the license communication file and requests the server 11 to transmit the license communication file via the network 13. Thereafter, the processing proceeds to step S14.

In response to this request, the server 11 transmits the license communication file including an installation key and the like in step S40 of FIG. 13 as described later.

In step S14, the PC 21 receives the license communication file from the server 11 via the network 13.

In step S15, the PC 21 stores the license communication file in the medium 22 according to, for example, an operation of the user.

Thereafter, the license acquisition processing ends.

On the other hand, in step S13, the PC 21 determines not to acquire the license communication file in a case where the display control file for finally confirming the execution of the installation of the license has not been received or in a case where an instruction on the acquisition of the license communication file has not been given. Thereafter, the processing of steps S14 and S15 is skipped, such that the license acquisition processing ends without acquiring the license communication file.

<License Issuance Processing>

Next, license issuance processing executed by the server 11, corresponding to the license acquisition processing by the client 12 of FIG. 6 will be described with reference to a flowchart of FIG. 13.

Figure 6:
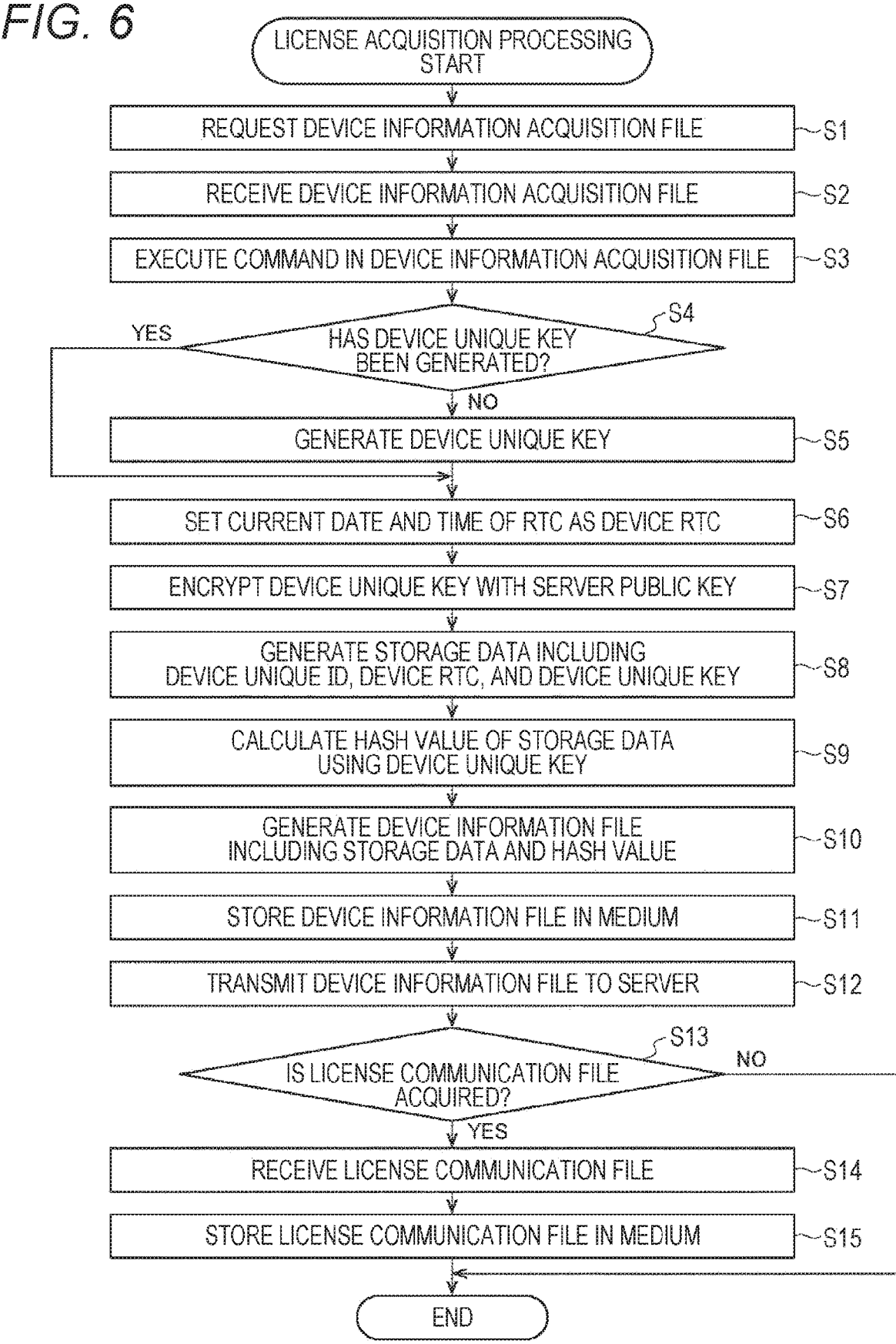
FIG. 6 is a flowchart for describing license acquisition processing executed by a client.

Note that this processing is started, for example, when the server 11 has received the request for the device information acquisition file from the PC 21 in step S1 of FIG. 6 described above.

In step S31, the server 11 transmits the device information acquisition file. Specifically, the data generation unit 152 generates the device information acquisition file including the device information acquisition command. The communication unit 103 transmits the device information acquisition file to the PC 21 via the network 13 under the control of the communication control unit 154.

Note that the processing of step S31 can be omitted by omitting the processing of steps S1 to S3 of FIG. 6 of the electronic device 23 as described above.

In step S32, the server 11 receives the device information file. Specifically, the communication control unit 154 receives the device information file transmitted from the PC 21 in the processing of step S12 of FIG. 6 described above, via the communication unit 103.

In step S33, the license management unit 151 determines whether or not the device information file is valid. Specifically, the license management unit 151 reads the server secret key corresponding to the server public key used to encrypt the device unique key included in the device information file, from the storage unit 106. The license management unit 151 decrypts the device unique key using the read server secret key.

Next, the license management unit 151 calculates a hash value of the storage data included in the device information file using the same hash function as that of the electronic device 23 and the decrypted device unique key. Then, the license management unit 151 determines that the device information file is valid in a case where the calculated hash value coincides with a hash value in the device information file, and the processing proceeds to step S34.

Therefore, tampering or the like of the device unique ID, the device RTC, and the device unique key in the storage data is prevented.

In step S34, the license management unit 151 determines whether or not to transmit the license communication file.

Specifically, the UI control unit 153 generates the display control file for finally confirming the execution of the installation of the license. The communication unit 103 transmits the display control file to the PC 21 via the network 13 under the control of the communication control unit 154.

Then, the license management unit 151 determines to transmit the license communication file in a case where the PC 21 requests the server to transmit the license communication file in step S13 of FIG. 6 described above, and the processing proceeds to step S35.

In step S35, the license management unit 151 generates an installation key.

FIGS. 14A, 14B, and 14C illustrate examples of formats of installation keys.

FIG. 14A illustrates a format example of an installation key in a case where only an effective term is set. This installation key includes a function ID, system unique information, a device unique ID, and an effective term.

The function ID is an ID for identifying a function that becomes a target of a license.

The system unique information is a serial number including alphanumeric characters generated by the server 11, and is different for every installation key.

The device unique ID is a device unique ID of the electronic device 23 that becomes a target to which the license is to be provided, and the device unique ID of the electronic device 23 included in the device information file is used.

The effective term indicates an effective term of the license. For example, the effective term is set in units of hours. Note that the effective term is set to, for example, a value obtained by adding a grace time to an actual effective term of the license. For example, in a case where the actual effective term of the license is 30 days and the grace time is 1 hour, this effective term is set to 721 hours (=24 hours×30 days+1 hour).

Here, the grace time is a time set on the assumption that a time is required to install the license in the electronic device 23. That is, since the electronic device 23 does not directly communicate with the server 11 via the network 13, the electronic device 23 exchanges data with the PC 21 via the medium 22, and the PC 21 communicates with the server 11. Therefore, as compared with a case where the electronic device 23 directly communicates with the server 11, it takes time to install the license. Therefore, a predetermined grace time is added, in addition to the actual effective term of the license.

FIG. 14B illustrates a format example of an installation key in a case where only an expiration time is set. This installation key is different from that of the example of FIG. 14A in that it includes an expiration time instead of the effective term.

The expiration time indicates the date and time when the license expires, and is represented by, for example, year, month, day, hour, minute, and second. Furthermore, the expiration time is set on the basis of the device RTC included in the device information file, that is, the RTC 206 of the electronic device 23. For example, when the expiration time based on the RTC 105 of the server 11 is a server expiration time and the current date and time of the RTC 105 is the server current date and time, an expiration time (client expiration time) of the installation key is calculated by the following Equation (1).

$$\text{Expiration Time} = \text{Device RTC} + (\text{Server Expiration Time} - \text{Current Server Date and Time}) \quad (1)$$

The expiration time is converted from the date and time based on the RTC 105 of the server 11 to the date and time based on the RTC 206 of the electronic device 23 by Equation (1).

FIG. 14C illustrates a format example of an installation key in a case where both of an expiration time and an effective term are set. The expiration time of this example is also set on the basis of the device RTC included in the device information file. Furthermore, in this example, the start date and time of the license is calculated by subtracting the effective term from the expiration time. That is, this license is effective from the start date and time until the expiration time.

Note that in this example, the grace time does not necessarily need to be added to the effective term on the assumption that the license is installed by the start date and time. That is, the grace time may be added to the effective term or may not be added to the effective term.

In step S36, the data generation unit 152 generates storage data including the device RTC and the installation key.

In step S37, the data generation unit 152 calculates a hash value of the storage data using the device unique key. That is, the data generation unit 152 calculates a hash value of the storage data using the same hash function as that of the electronic device 23 and the device unique key included in the device information file.

In step S38, the data generation unit 152 generates a license communication file including the storage data and the hash value. Specifically, the data generation unit 152 generates a signature by encrypting the hash value using the server secret key. Then, the data generation unit 152 generates a license communication file including the storage data and the signature (encrypted hash value). Therefore, security of the storage data is ensured using the device unique key.

Note that the license communication file is also an installation file used to install the license in the electronic device 23.

In step S39, the server 11 stores license information. For example, the storage control unit 155 causes the storage unit 106 to store license information including a combination of the current date and time of the RTC 105, the device unique ID, the device unique key, the installation key, the device RTC, and the server expiration time of the license.

Note that in a case where only the effective term is set in the installation key as illustrated in FIG. 14A, the license management unit 151 calculates the server expiration time by adding the effective term (including the grace time) to the current date and time of the RTC 105. Furthermore, for example, in a case where the expiration time is set in the installation key as illustrated in FIG. 14B or 14C, the license management unit 151 uses a server expiration time before conversion of the expiration time (client expiration time) of the installation key as the license information.

Furthermore, an approximate deviation between the RTC 105 of the server 11 and the RTC 206 of the electronic device 23 is grasped on the basis of a difference between the current date and time of the RTC 105 and the device RTC.

In step S40, the communication unit 103 transmits the license communication file to the PC 21 under the control of the communication control unit 154.

Thereafter, the license issuance processing ends.

On the other hand, in step S34, the license management unit 151 determines not to transmit the license communication file in a case where the PC 21 does not request the server to transmit the license communication file in step S13 of FIG. 6 described above, the processing of steps S35 to S40 is skipped, and the license issuance processing ends. That is, the generation of the installation key and the transmission of the license communication file are not performed.

Furthermore, in step S33, the license management unit 151 determines that the device information file is not valid in a case where the calculated hash value does not coincide with the hash value in the device information file, the processing of steps S34 to S40 is skipped, and the license issuance processing ends. That is, the generation of the installation key and the transmission of the license communication file are not performed.

<License Management Processing>

Figure 15:
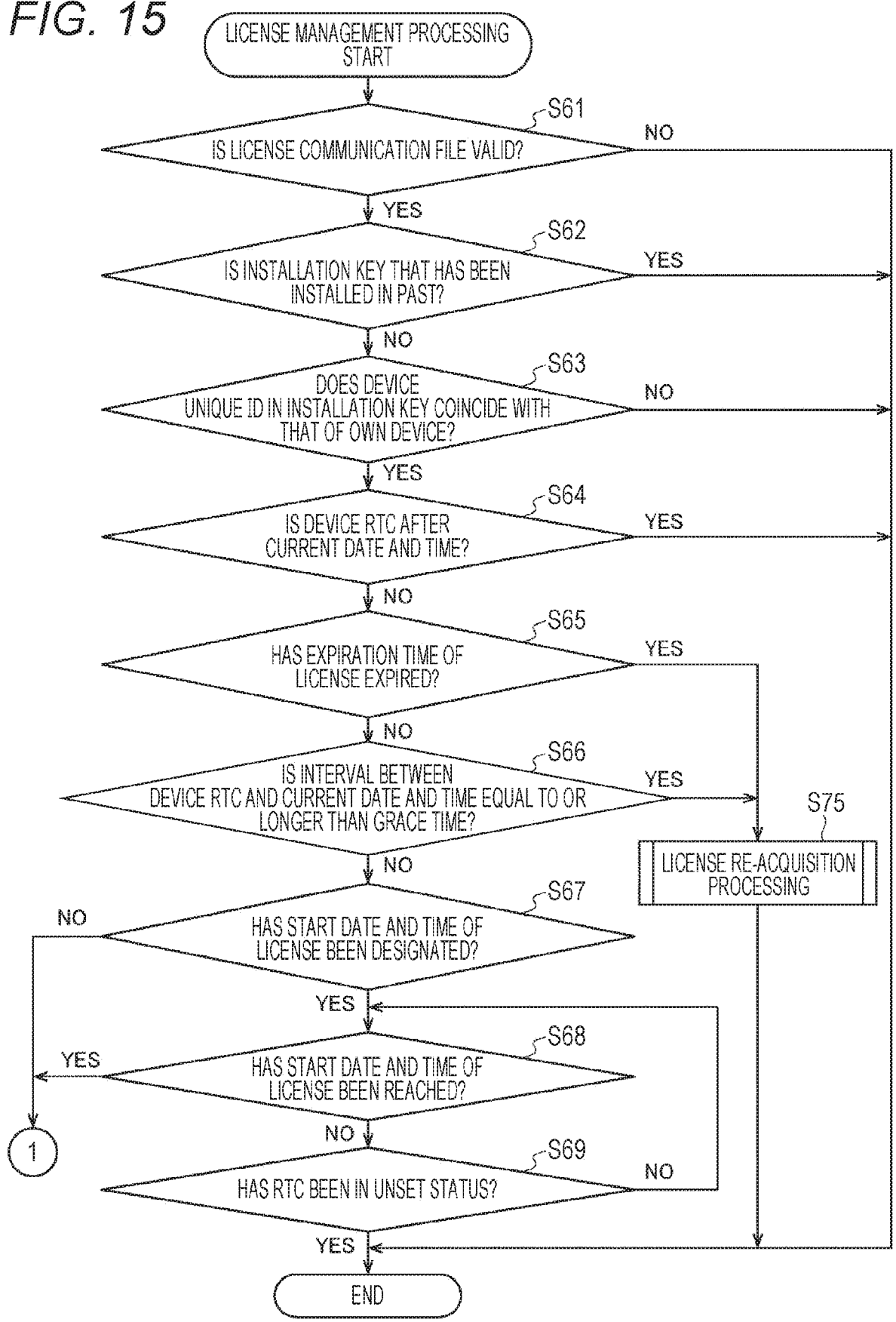
FIG. 15 is a flowchart for describing license management processing executed by the client.
Figure 16:
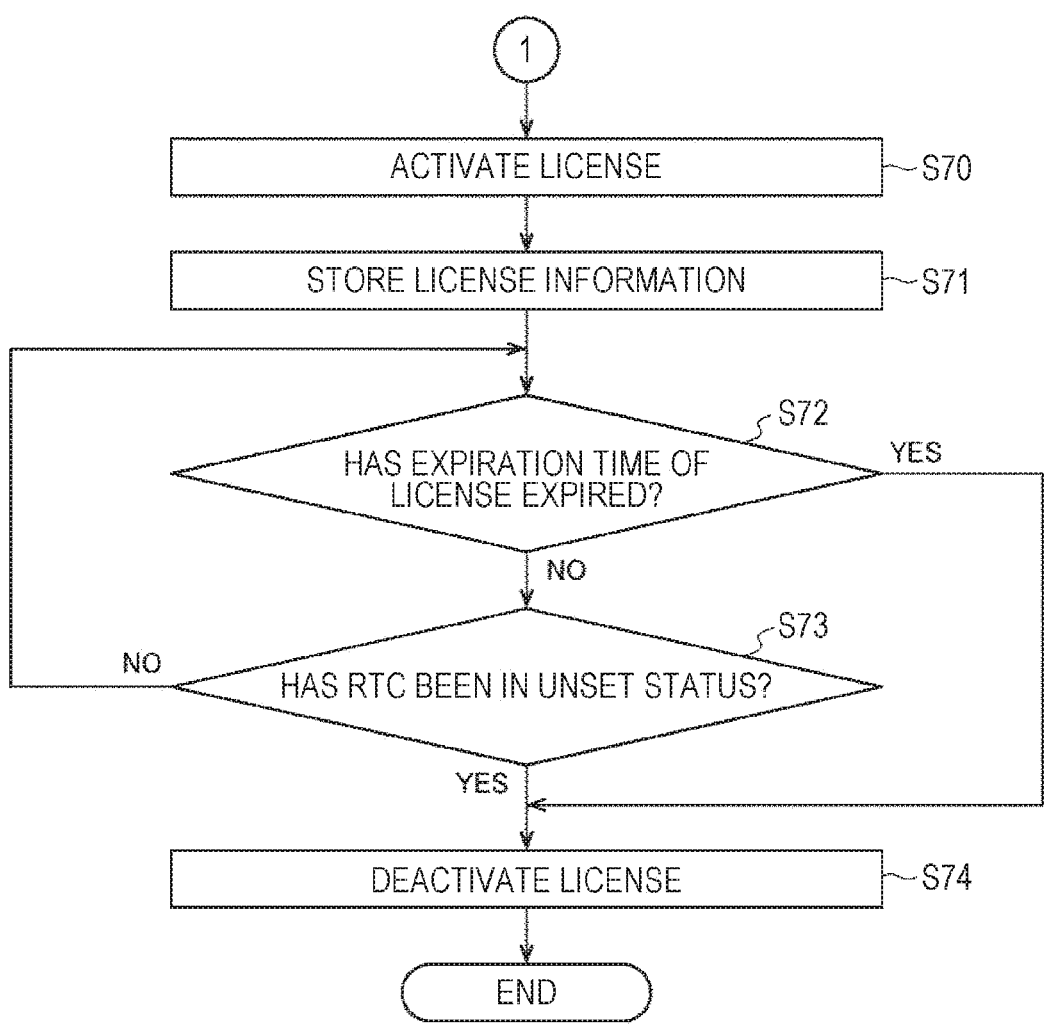
FIG. 16 is a flowchart for describing license management processing executed by the client.

Next, license management processing executed by the electronic device 23 will be described with reference to flowcharts of FIGS. 15 and 16.

Figure 17:
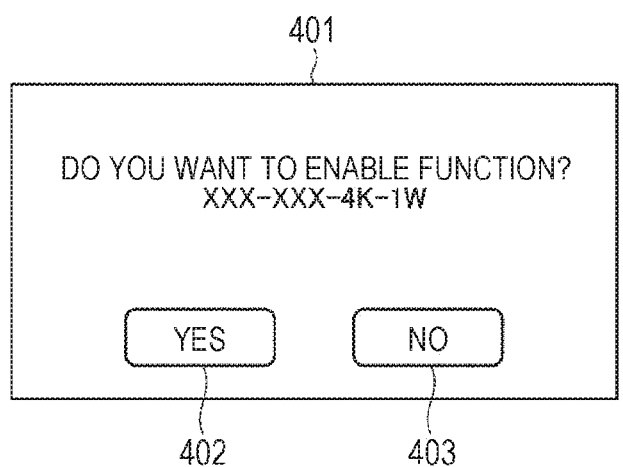
FIG. 17 is a diagram illustrating an example of a screen of the electronic device.

For example, when the medium 22 in which the license communication file is stored is connected to the drive 208 of the electronic device 23, the output unit 205 displays a window 401 of FIG. 17 under the control of the UI control unit 254, for example.

In the window 401, a type name of the electronic device 23, a type of function and a license type, and a message for confirming whether or not to enable the function are displayed. Furthermore, a YES button 402 and a NO button 403 are displayed in the window 401. Then, in a case where the YES button 402 is pressed, the license management processing is started. On the other hand, in a case where the NO button 403 is pressed, the license management processing is not started.

In step S61, the license management unit 251 determines whether or not the license communication file is valid. Specifically, the license management unit 251 reads the license communication file from the medium 22 via the drive 208. Furthermore, the license management unit 251 reads the device unique key and the server public key from the storage unit 207.

The license management unit 251 decrypts the signature included in the license communication file using the server public key. Therefore, the hash value of the storage data included in the license communication file is obtained. Furthermore, the license management unit 251 calculates the hash value of the storage data of the license communication file using the same hash function as that of the server 11 and the device unique key. Then, the license management unit 251 determines that the license communication file is valid in a case where the calculated hash value coincides with a hash value in the license communication file, and the processing proceeds to step S62.

Therefore, tampering or the like of the device RTC and the installation key in the storage data is prevented.

In step S62, the license management unit 251 determines whether or not the installation key is an installation key that has been installed in the past. The license management unit 251 determines that the installation key is not the installation key that has been installed in the past in a case where an installation key coinciding with the installation key included in the license communication file is not stored in the storage unit 207, and the processing proceeds to step S63.

Therefore, it is prevented that the license is installed doubly using the installation key that has been installed in the past.

In step S63, the license management unit 251 determines whether or not the device unique ID in the installation key coincides with that of an own device. The license management unit 251 determines that the device unique ID in the installation key coincides with that of the own device in a case where the device unique ID in the installation key coincides with the device unique ID of the electronic device 23 stored in the storage unit 207, and the processing proceeds to step S64.

Therefore, it is prevented that the license is installed using an installation key for another electronic device 23.

In step S64, the license management unit 251 determines whether or not the device RTC is on and after the current date and time. In a case where the license management unit 251 determines that the device RTC included in the license communication file is before the current date and time of the RTC 206, the processing proceeds to step S65.

In step S65, the license management unit 251 determines whether or not an expiration time of the license has expired.

Specifically, the license management unit 251 calculates the expiration time (client expiration time) of the license by adding the effective term to the device RTC in a case where only the effective term is included in the installation key as illustrated in FIG. 14A. Then, the license management unit 251 compares the calculated expiration time with the current date and time of the RTC 206.

On the other hand, the license management unit 251 compares the expiration time with the current date and time of the RTC 206 in a case where the expiration time (client expiration time) is included in the installation key as illustrated FIG. 14B or 14C.

Then, the license management unit 251 determines that the expiration time of the license has not expired in a case where the expiration time of the license is after the current date and time of the RTC 206, and the processing proceeds to step S66.

In step S66, the license management unit 251 determines whether or not an interval between the device RTC and the current date and time is equal to or longer than the grace time. In a case where the license management unit 251 compares the device RTC with the current date and time of the RTC 206 to determine that the interval between the device RTC and the current date and time is less than the grace time, the processing proceeds to step S67.

This is, for example, a case where installation of the license in the electronic device 23 has been performed within the grace time (for example, one hour) since the device RTC was set in the processing of step S6 of FIG. 6 described above.

In step S67, the license management unit 251 determines whether or not the start date and time of the license has been designated. The license management unit 251 determines that the start date and time of the license has been designated in a case where the expiration time and the effective term are included in the installation key as illustrated in FIG. 14C, and the processing proceeds to step S68.

In step S68, the license management unit 251 determines whether or not the start date and time of the license has been reached. Specifically, the license management unit 251 calculates the start date and time of the license by subtracting the effective term from the expiration time of the installation key. The license management unit 251 determines that the start date and time of the license has not been reached in a case where the calculated start date and time of the license is after the current date and time of the RTC 206, and the processing proceeds to step S69.

In step S69, the license management unit 251 determines whether or not the RTC 206 has been in an unset status. In a case where it is determined that the RTC 206 has not been in the unset status, the processing returns to step S68.

Thereafter, the processing of steps S68 and S69 is repeatedly executed until it is determined in step S68 that the start date and time of the license has been reached or it is determined in step S69 that the RTC 206 has been in the unset status.

On the other hand, in a case where it is determined in step S69 that the RTC 206 has been in the unset status, the license management processing ends.

This is, for example, a case where the RTC 206 has been in the unset status due to a reason such as run-out of the backup battery, or the like, before the start date and time of the license is reached. That is, when the RTC 206 is in the unset status, period management of the license cannot be performed, and thus, the license management processing ends without activating the license.

Furthermore, in step S68, the license management unit 251 determines that the start date and time of the license has been reached in a case where the calculated start date and time of the license is before the current date and time of the RTC 206, and the processing proceeds to step S70.

Moreover, in step S67, the license management unit 251 determines that the start date and time of the license has not been designated in a case where only one of the expiration time or the effective term is included in the installation key as illustrated in FIG. 14A or 14B, and the processing proceeds to step S70.

In step S70, the license management unit 251 activates the license. That is, the license management unit 251 makes a function whose license is given by the installation key usable.

Note that software realizing the function may be installed in the electronic device 23 in advance or may be installed at this time.

In step S71, the electronic device 23 stores the license information. Specifically, the license management unit 251 obtains the client expiration time of the license by processing similar to that of step S65. The storage control unit 256 causes the storage unit 207 to store the license information including a combination of the current date and time of the RTC 206, the installation key, and the client expiration time of the license. Note that the current date and time of the RTC 206 is the date and time when the license is started to be used.

In step S72, the license management unit 251 determines whether or not the expiration time of the license has expired. The license management unit 251 determines that the expiration time of the license has not expired in a case where the expiration time of the license stored in the storage unit 207 is after the current date and time of the RTC 206, and the processing proceeds to step S73.

In step S73, it is determined whether or not the RTC 206 has been in an unset status, similarly to the processing of step S69. In a case where it is determined that the RTC 206 has not been in the unset status, the processing returns to step S72.

Thereafter, the processing of steps S72 and S73 is repeatedly executed until it is determined in step S72 that the expiration time of the license has expired or it is determined in step S73 that the RTC 206 has been in the unset status.

On the other hand, in a case where it is determined in step S73 that the RTC 206 has been in the unset status, the processing proceeds to step S74. This is a case when the RTC 206 has been in the unset status during the effective term of the license.

Furthermore, in step S72, the license management unit 251 determines that the expiration time of the license has expired in a case where the expiration time of the license stored in the storage unit 207 is before the current date and time of the RTC 206, and the processing proceeds to step S74.

In step S75, the license management unit 251 deactivates the license.

Specifically, the license management unit 251 makes a function whose expiration time of the license has expired unusable, in a case where the expiration time of the license has expired.

On the other hand, the license management unit 251 cannot perform period management of the license in a case where the RTC 206 has been in the unset status, and thus, makes the function unusable. Note that in a case where there is a plurality of functions whose licenses are managed by a similar method, all of those functions are made unusable.

Note that when a condition for deactivating the license is satisfied in a case where the power supply of the electronic device 23 is turned on, it is desirable to deactivate the license, for example, at a timing when the power supply of the electronic device 23 is turned off next or at a timing when the power supply of the electronic device 23 is turned on again after the power supply of the electronic device 23 is turned off next. This is because when the license is deactivated in a case where the power supply of the electronic device 23 is turned on, there is a possibility that a function cannot be suddenly used while the electronic device 23 is being used, such that there is a possibility that convenience of the user will be impaired.

Thereafter, the license management processing ends.

On the other hand, in step S66, in a case where the license management unit 251 determines that the interval between the device RTC and the current date and time of the RTC 206 is equal to or longer than the grace time, the processing proceeds to step S75.

This is, for example, a case where installation of the license in the electronic device 23 has been performed after the grace time (for example, one hour) has elapsed since the device RTC was set in the processing of step S6 of FIG. 6 described above.

Furthermore, in step S65, the license management unit 251 determines that the expiration time of the license has expired in a case where the expiration time of the license is before the current date and time of the RTC 206, and the processing proceeds to step S75.

This is, for example, a case where the installation of the license in the electronic device 23 has been performed after the expiration time of the license has expired.

In step S75, license re-acquisition processing is executed, and thereafter, the license management processing ends.

Note that details of the license re-acquisition processing will be described later with reference to FIG. 18.

On the other hand, in a case where it is determined in step S64 that the device RTC is on and after the current date and time of the RTC 206, the license management processing ends.

This is, for example, a case where tampering of the device RTC, abnormality of the RTC 206, or the like, has occurred.

Furthermore, in a case where it is determined in step S63 that the device unique ID in the installation key does not coincide with that of the own device, the license management processing ends.

This is, for example, a case where it has been attempted to connect the medium 22 to a different electronic device 23 to install the license, a case where an erroneous license communication file has been received, a case where the installation key has been tampered with, or the like.

Moreover, in step S62, the license management unit 251 determines that the installation key is the installation key that has been installed in the past in a case where the installation key coinciding with the installation key included in the license communication file is stored in the storage unit 207, and the license management processing ends.

This is a case where it has been attempted to install the previously installed license again.

Furthermore, in step S61, the license management unit 251 determines that the license communication file is not valid in a case where the calculated hash value does not coincide with the hash value in the license communication file, and the license management processing ends.

This is a case where tampering or the like of the license communication file has been performed.

In such a manner, even though the server 11 and the electronic device 23 do not directly communicate with each other, the license can be installed in the electronic device 23 in a safe status to make the function of the electronic device 23 usable.

Furthermore, even though a deviation is generated between the RTC 105 of the server 11 and the RTC 206 of the electronic device 23, the period management of the license can be appropriately performed using the RTC 206 of the electronic device 23.

Moreover, by adding the grace time to the effective term of the license, it is prevented that a term in which the license can be used is shortened even though it takes time to install the license because the server 11 and the electronic device 23 do not directly communicate with each other.

Furthermore, even though the server 11 and the electronic device 23 do not communicate directly with each other, a deviation between an expiration time (server expiration time) of the license grasped by the server 11 and an actual expiration time (client expiration time) of the license is suppressed within the grace time. Therefore, for example, a promotion such as update of the license, or the like, can be performed at an appropriate timing.

<License Re-Acquisition Processing>

Next, details of the license re-acquisition processing of step S75 of FIG. 15 will be described with reference to a flowchart of FIG. 18.

In step S101, the PC 21 requests a license re-issuance file.

Figure 19:
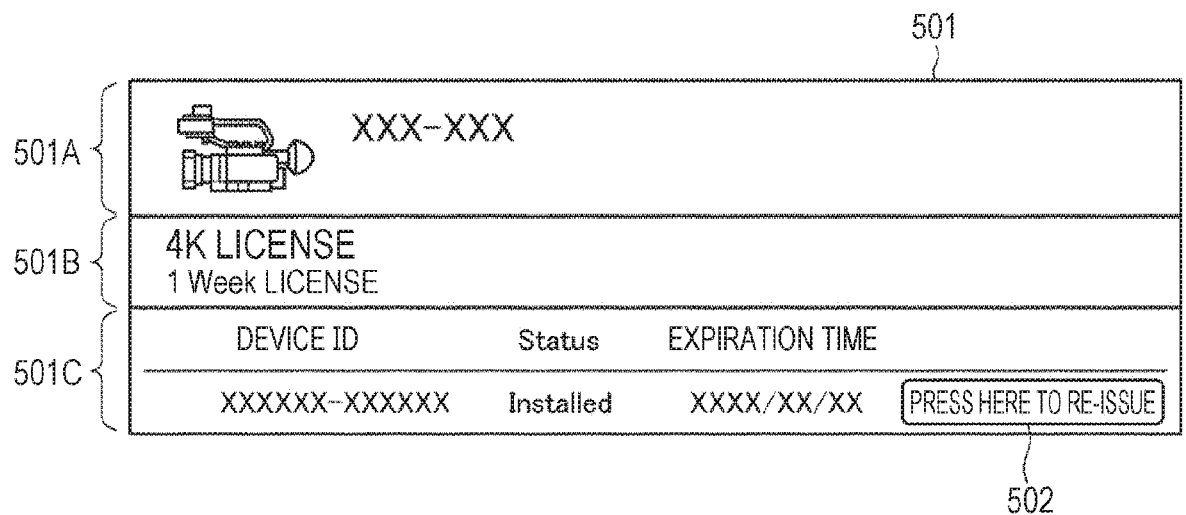
FIG. 19 is a diagram illustrating an example of a screen of the PC.

For example, the PC 21 accesses the server 11 via the network 13 according to an operation of the user to display a screen for requesting re-issuance of the license. For example, a window 501 of FIG. 19 is displayed on the screen of the PC 21.

The window 501 is divided into a device information field 501A, a license information field 501B, and a license detailed information field 501C.

At a left end of the device information field 501A, an image and a type name of the electronic device 23 are displayed laterally side by side.

At a left end of the license information field 501B, a function that becomes a target re-issuing the license and a type of the license are shown. In this example, it is shown that a license of an imaging function of a 4K image during an effective term of one week is a re-issuance target.

In the license detailed information field 501C, a detailed status of the license of the function that becomes the target is shown. In this example, a device unique ID of the electronic device 23, a current status of the license, and an expiration time of the license are displayed. Note that the current status of the license is "Installed" regardless of whether or not the license has been actually installed in the electronic device 23, at a point in time of downloading the license communication file.

At a right end of the license detailed information field 501C, a re-issuance button 502 is displayed. When the re-issuance button 502 is pressed, license re-issuance processing is started. For example, when the re-issuance button 502 is pressed, the PC 21 requests the server 11 to transmit the license re-issuance file, via the network 13.

Figure 24:
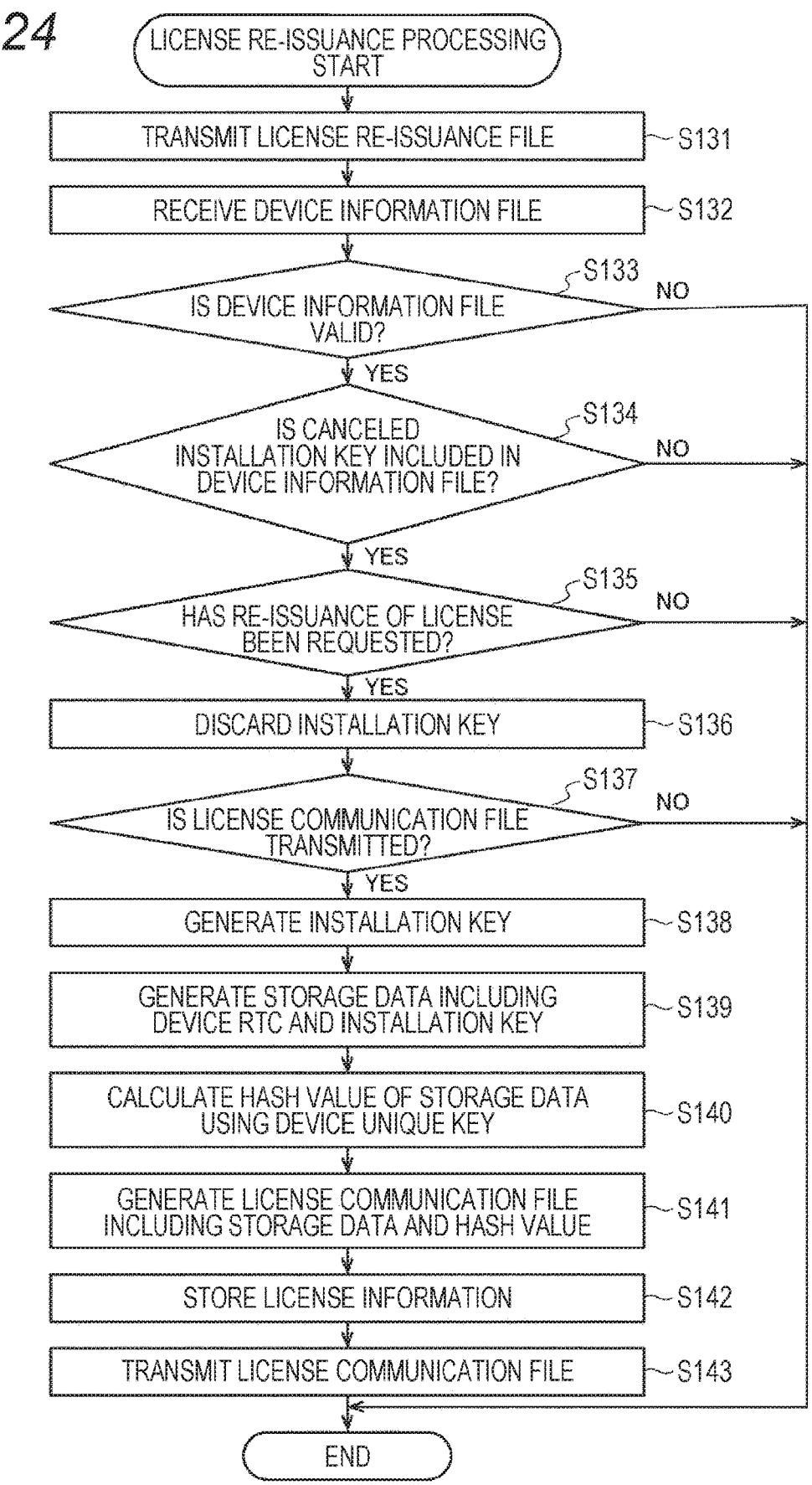
FIG. 24 is a flowchart for describing license re-issuance processing executed by the server.

In response to this request, the server 11 transmits the license re-issuance file to the PC 21 via the network 13 in step S131 of FIG. 24 as described later.

In step S102, the PC 21 receives the license re-issuance file transmitted from the server 11. Furthermore, the PC 21 stores the received license re-issuance file in the medium 22 according to, for example, an operation of the user.

Figure 20:
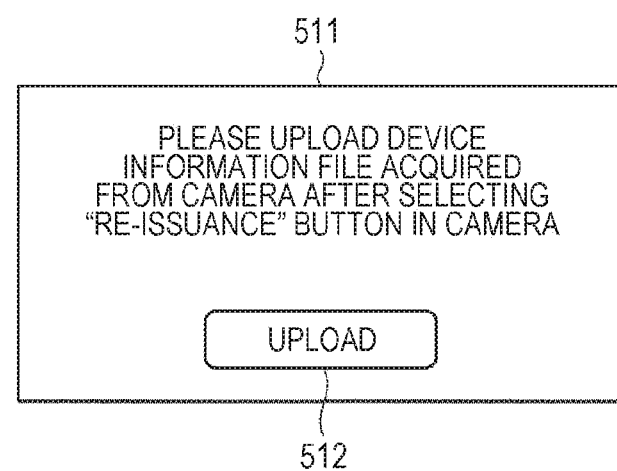
FIG. 20 is a diagram illustrating an example of a screen of the PC.
Figure 21:
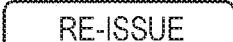
FIG. 21 is a diagram illustrating an example of a screen of the PC.

At this time, for example, a window 511 of FIG. 20 is displayed on the screen of the PC 21.

In the window 511, a message for prompting the user to upload the device information file acquired from the camera (electronic device 23) after selecting a "re-issuance" button in the camera (electronic device 23), and an upload button 512 are displayed.

In step S103, the electronic device 23 executes a command in the license re-issuance file.

Specifically, the user detaches the medium 22 in which the license re-issuance file is stored from the PC 21, and connects the medium 22 to the drive 208 of the electronic device 23.

The drive 208 reads the license re-issuance file stored in the medium 22 and supplies the read license re-issuance file to the control unit 203. The control unit 203 executes a license re-issuance command included in the license re-issuance file.

Therefore, for example, the output unit 205 displays a screen including a "re-issuance" button under the control of the UI control unit 254. Then, when the "re-issuance" button is pressed, acquisition processing of device information is started.

Note that, for example, the processing of steps S101 to S103 may be omitted, and processing of step S104 and subsequent steps may be started by operating the electronic device 23 by the user without using the license re-issuance command or automatically.

In step S104, the current date and time of the RTC 206 is set as the device RTC, similarly to the processing of step S6 of FIG. 6.

In step S105, the device unique key is encrypted with the server public key, similarly to the processing of step S7 of FIG. 6.

In step S106, the data generation unit 253 generates storage data including a device unique ID, the device RTC, the device unique key, and a canceled installation key. Specifically, the data generation unit 253 reads the device unique ID and an installation key for a license whose installation has been canceled (canceled installation key) from the storage unit 207. The data generation unit 253 generates storage data including the device unique ID, the device RTC, the encrypted device unique key, and the canceled installation key.

In step S107, a hash value of the storage data is calculated using the device unique key, similarly to the processing of step S9 of FIG. 6.

In step S108, a device information file including the storage data and the hash value is generated, similarly to the processing of step S10 of FIG. 6. This device information file is used by the server 11 to re-issue a license as a license re-request file for requesting re-issuance of the license.

In step S109, the device information file is stored in the medium 22, similarly to the processing of step S11 of FIG. 6.

In step S110, the PC 21 transmits the device information file to the server 11.

For example, the user detaches the medium 22 from the electronic device 23, and connects the medium 22 to the PC 21. Then, for example, when the upload button 512 in the window 511 of FIG. 20 described above is pressed, the PC 21 reads the device information file from the medium 22 and transmits the read device information file to the server 11 via the network 13.

In response to this transmission, the server 11 receives the device information file in step S132 of FIG. 24 as described later. Then, the server 11 notifies the PC 21 that the license can be re-issued, via the network 13 in step S134, if the device information file includes the canceled installation key and is valid.

In step S111, the PC 21 determines whether or not to request re-issuance of the license. For example, in a case where the PC 21 has been notified from the server 11 that the license can be re-issued, the PC 21 displays a window 521 of FIG. 21 on the screen.

In the window 521, a message to cancel installation and perform re-issuance of the installation key and a re-issuance button 522 are displayed. Furthermore, information regarding the license whose installation is canceled is displayed in the message. The information regarding the license includes, for example, a type name of the electronic device 23, a function name, and a type of the license.

Then, when the re-issuance button 522 is pressed, the PC 21 determines to request the re-issuance of the license, and requests the server 11 to re-issue the license, via the network 13. Thereafter, the processing proceeds to step S112.

In step S112, the PC 21 determines whether or not to acquire a license communication file.

Specifically, when the re-issuance of the license is requested, the server 11 discards a current installation key of the license in step S136 of FIG. 24 as described later, and then, transmits a display control file including a message for notifying the PC 21 that the installation key can be re-issued, to the PC 21.

Figure 22:
FIG. 22 is a diagram illustrating an example of a screen of the PC.
Figure 23:
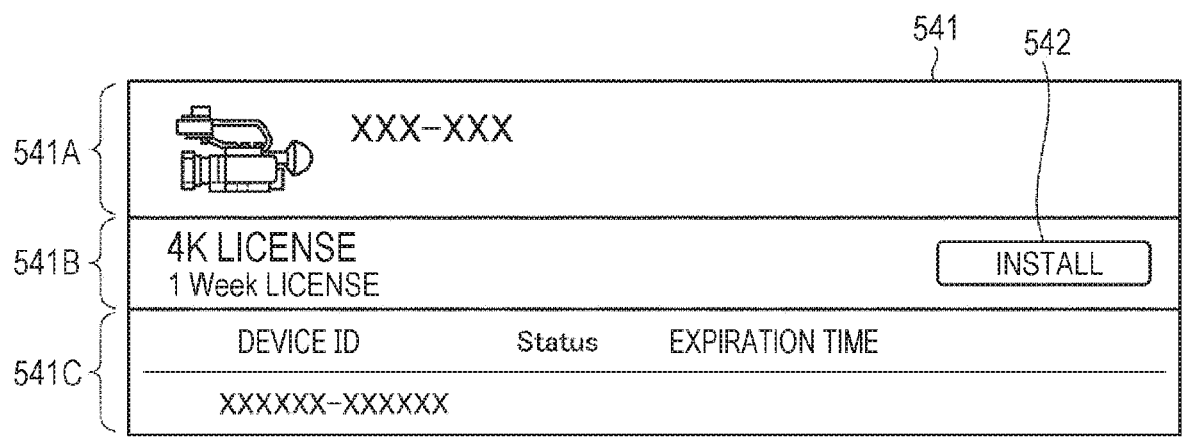
FIG. 23 is a diagram illustrating an example of a screen of the PC.

In response to this transmission, the PC 21 displays, for example, a window 531 of FIG. 22 on the screen. In the window 531, a message for prompting the user to cancel the installation of the license and installing the license again, and an OK button 532 are displayed. When the OK button 532 is pressed, a window 541 of FIG. 23 is displayed on the screen of the PC 21.

The window 541 is divided into a device information field 541A, a license information field 541B, and a license detailed information field 541C, similarly to the window 501 of FIG. 19, and has display contents substantially similar to those of the window 501. However, the window 541 is different from the window 501 in that the re-issuance button 502 disappears and an installation button 542 is displayed at a right end of the license information field 501B. Furthermore, the window 541 is different from the window 501 in that nothing is displayed with respect to a current status of the license and an expiration time.

Then, when the installation button 542 is pressed, the PC 21 determines to acquire the license communication file and requests the server 11 to transmit the license communication file via the network 13. Thereafter, the processing proceeds to step S113.

In response to this request, the server 11 transmits the license communication file including an installation key and the like in step S143 of FIG. 24 as described later.

In step S113, the license communication file is received, similarly to the processing of step S14 of FIG. 6.

In step S114, the license communication file is stored in the medium 22, similarly to the processing of step S15 of FIG. 6.

Thereafter, the license re-acquisition processing ends.

<License Re-Issuance Processing>

Next, license re-issuance processing executed by the server 11, corresponding to the license re-acquisition processing by the client 12 of FIG. 18 will be described with reference to a flowchart of FIG. 24.

Figure 18:
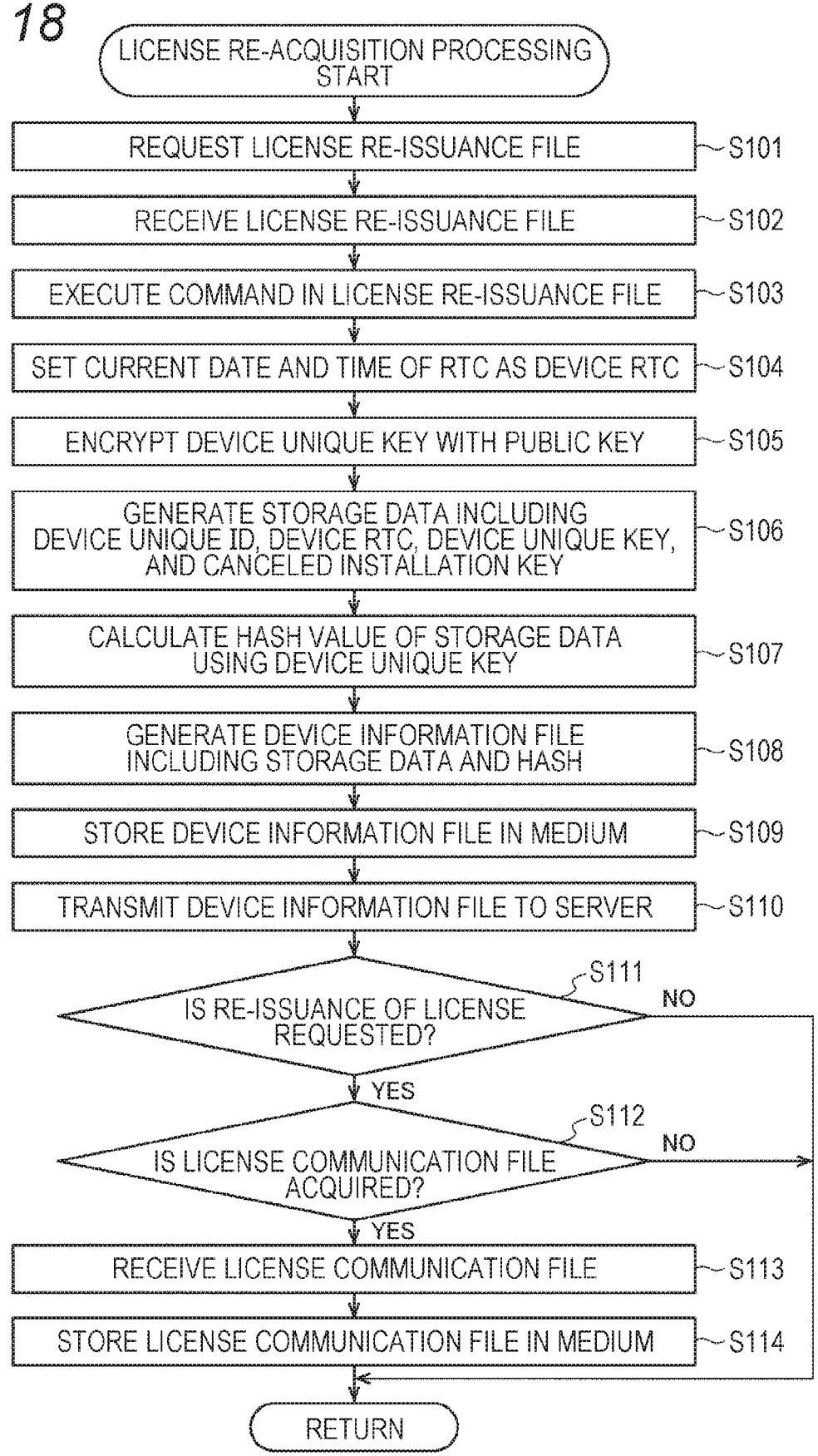
FIG. 18 is a flowchart for describing license re-acquisition processing executed by the client.

Note that this processing is started, for example, when the server 11 has received the request for the license re-issuance file from the PC 21 in step S101 of FIG. 18 described above.

In step S131, the server 11 transmits the license re-issuance file. Specifically, the data generation unit 152 generates the license re-issuance file including the license re-issuance command. The communication unit 103 transmits the license re-issuance file to the PC 21 via the network 13 under the control of the communication control unit 154.

Note that the processing of step S131 can be omitted by omitting the processing of steps S101 to S103 of FIG. 18 of the electronic device 23 as described above.

In step S132, the server 11 receives the device information file. Specifically, the communication control unit 154 receives the device information file transmitted from the PC 21 in the processing of step S110 of FIG. 18 described above, via the communication unit 103.

Figure 13:
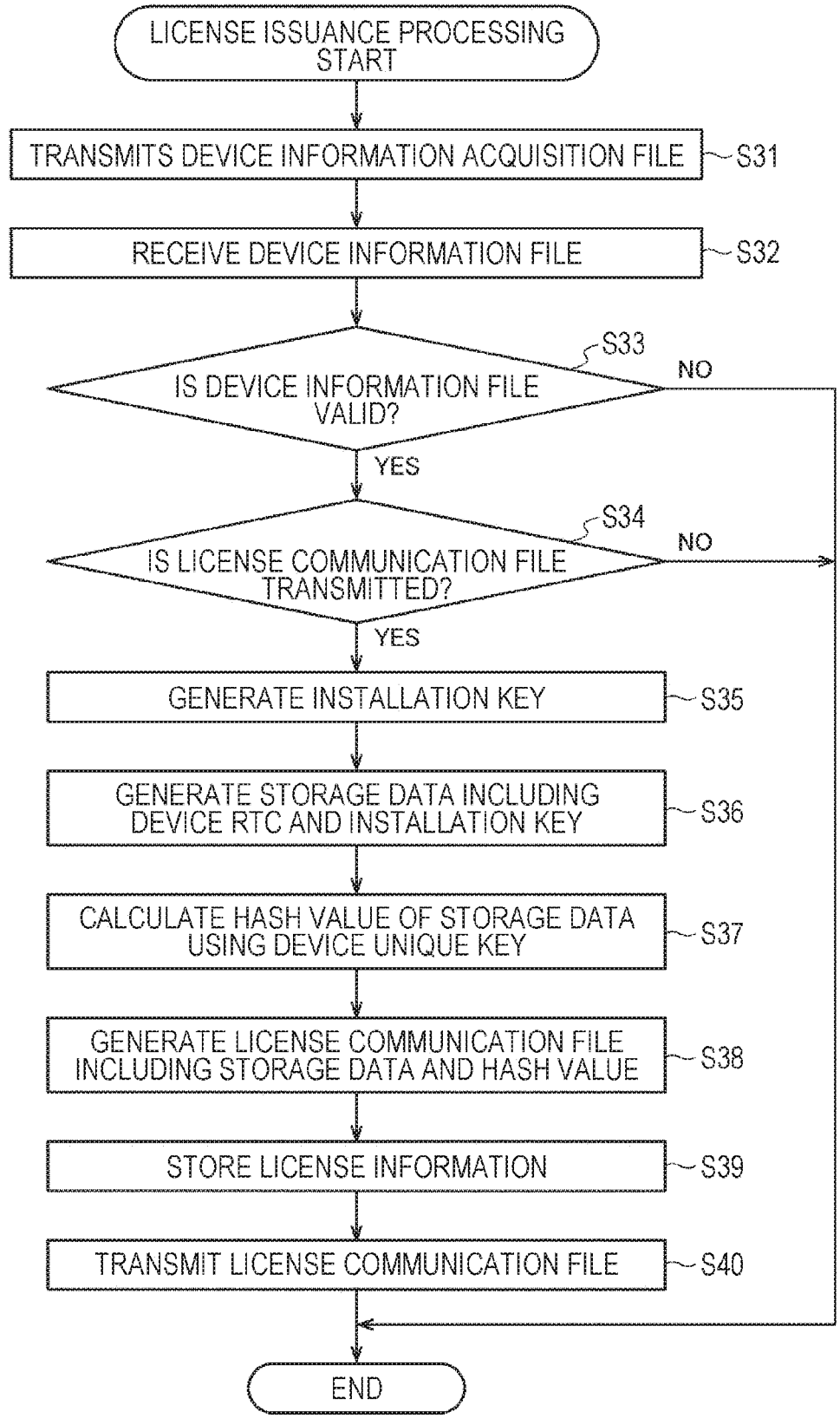
FIG. 13 is a flowchart for describing license issuance processing executed by the server.

In step S133, it is determined whether or not the device information file is valid, similarly to the processing of step S33 of FIG. 13. In a case where it is determined that the device information file is valid, the processing proceeds to step S134.

In step S134, the license management unit 151 determines whether or not the canceled installation key is included in the device information file. In a case where it is determined that the canceled installation key is included in the device information file, the processing proceeds to step S135. At this time, the communication unit 103 notifies the PC 21 that the license can be re-issued, via the network 13 under the control of the communication control unit 154.

In step S135, the license management unit 151 determines whether or not the re-issuance of the license has been requested. The license management unit 151 determines that the re-issuance of the license has been requested in a case where the re-issuance of the license has been requested from the PC 21 in step S111 of FIG. 18 described above, and the processing proceeds to step S136.

In step S136, the license management unit 151 discards the installation key. For example, the license management unit 151 updates the information with the installation key as the installation key for the license whose installation has been canceled, in the license information including the installation key included in the device information file among the license information stored in the storage unit 106.

Furthermore, the UI control unit 153 also generates a display control file including a message for notifying the PC 21 that the installation key can be re-issued. The communication unit 103 transmits the display control file to the PC 21 via the network 13 under the control of the communication control unit 154.

In step S137, the license management unit 151 determines whether or not to transmit the license communication file. The license management unit 151 determines to transmit the license communication file in a case where the PC 21 requests the server to transmit the license communication file in step S112 of FIG. 18 described above, and the processing proceeds to step S138.

In step S138, the installation key is generated, similarly to the processing of step S35 of FIG. 13 described above. At this time, in a case where the installation key includes an expiration time, the expiration time (client expiration time) is set on the basis of the device RTC included in the device information file received in the processing of step S132. That is, the license expiration time is updated on the basis of the newly acquired device RTC.

Thereafter, in steps S139 to S143, processing similar to that of steps S36 to S40 of FIG. 13 described above is performed. Therefore, a license communication file including the device RTC in the device information file received in step S132 and the regenerated installation key is generated and transmitted to the PC 21.

Thereafter, the license re-issuance processing ends.

On the other hand, in step S137, the license management unit 151 determines not to transmit the license communication file in a case where the PC 21 does not request the server to transmit the license communication file in step S112 of FIG. 18 described above, the processing of steps S138 to S143 is skipped, and the license re-issuance processing ends.

That is, the regeneration of the installation key and the transmission of the license communication file are not performed. However, by again requesting the re-issuance of the license from the PC 21 later, it is possible to cause the server 11 to regenerate the installation key and transmit the license communication file including the regenerated installation key.

Furthermore, in step S135, the license management unit 151 determines that the re-issuance of the license has not been requested in a case where the re-issuance of the license has not been requested from the PC 21 in step S111 of FIG. 18 described above, the processing of steps S136 to S143 is skipped, and the license re-issuance processing ends. That is, the regeneration of the installation key and the transmission of the license communication file are not performed.

Moreover, in a case where it is determined in step S134 that the canceled installation key is not included in the device information file, the processing of steps S135 to S143 is skipped, and the license re-issuance processing ends. That is, the regeneration of the installation key and the transmission of the license communication file are not performed.

Furthermore, in a case where it is determined in step S133 that the device information file is not valid, the processing of steps S134 to S143 is skipped, and the license re-issuance processing ends. That is, the regeneration of the installation key and the transmission of the license communication file are not performed.

In such a manner, even though the server 11 and the electronic device 23 do not directly communicate with each other, the re-issuance of the license whose installation has been canceled can be performed and the re-issued license can be installed in the electronic device 23 in a safe status to make the function of the electronic device 23 usable.

Furthermore, since the expiration time of the license is updated on the basis of the new device RTC, it is prevented that the effective term of the license is shortened due to the re-issuance of the license. Moreover, even though a deviation is generated between the RTC 105 of the server 11 and the RTC 206 of the electronic device 23, period management of the re-issued license can be appropriately performed using the RTC 206 of the electronic device 23.

2. Modification

Hereinafter, a modification of the embodiment of the present technology described above will be described For example, another information processing apparatus (for example, a smartphone, a tablet, and the like) that can communicate with the server 11 and can read and write data from and to the medium 22 may be used, instead of the PC 21.

Furthermore, for example, the server 11 and the electronic device 23 may exchange data with each other via another information processing apparatus (for example, a smartphone, a tablet, or the like) without using the medium 22.

Figure 25A:
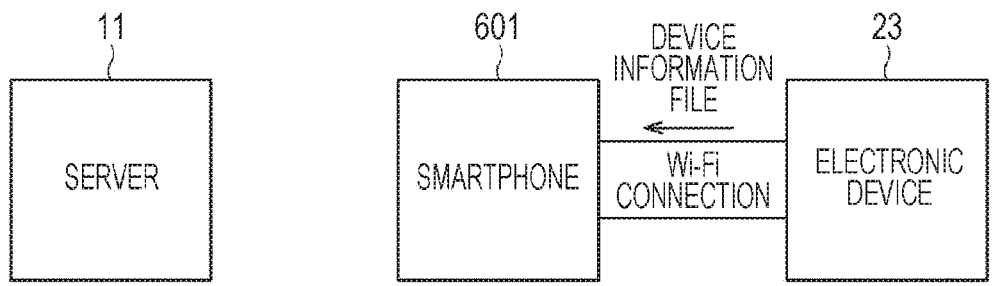
FIGS. 25A, 25B, and 25C are diagrams illustrating a modification of a method of exchanging data between the server and the electronic device.
Figure 25B:
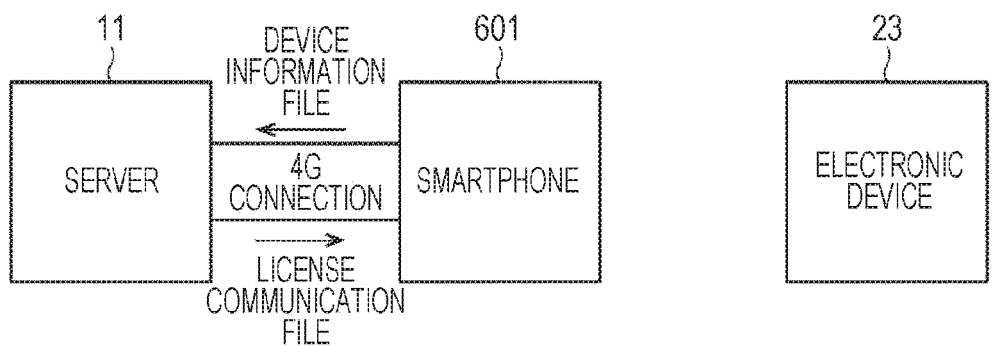
Figure 25C:
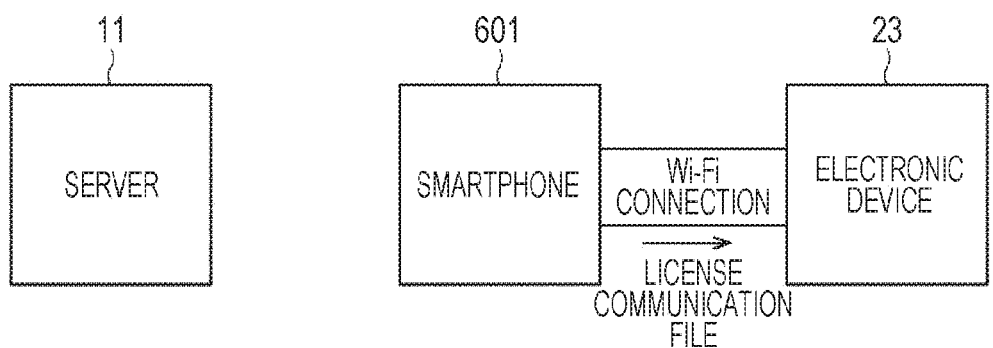

FIGS. 25A, 25B, and 25C illustrate an example of a case where the server 11 and the electronic device 23 exchange data with each other via a smartphone 601.

For example, the server 11 and the smartphone 601 perform communication based on a 4th generation (4G) mobile communication standard (hereinafter, referred to as 4G communication). The electronic device 23 and the smartphone 601 perform communication with each other via Wi-Fi.

In this case, since the smartphone 601 cannot perform the 4G communication and the Wi-Fi communication at the same time, exchange of data is sequentially performed, similarly to a case of using the medium 22 described above.

Specifically, first, the electronic device 23 and the smartphone 601 are connected to each other by the Wi-Fi, and the electronic device 23 transmits a device information file to the smartphone 601.

Next, the server 11 and the smartphone 601 are connected to each other by the 4G communication, and the smartphone 601 transmits the device information file to the server 11. The server 11 generates a license communication file using the received device information file and transmits the license communication file to the smartphone 601.

Next, the electronic device 23 and the smartphone 601 are reconnected to each other by the Wi-Fi, and the electronic device 23 transmits the license communication file to the smartphone 601. Then, the electronic device 23 installs a license using the license communication file.

In such a manner, the license provided by the server 11 can be installed in the electronic device 23 without using the media 22 and without performing direct communication between the server 11 and the electronic device 23. Furthermore, since security of a communication path between the server 11 and the electronic device 23 is secured using a device unique key, tampering or the like of data is prevented.

Note that in this case, a series of installation processing is limited so as to be performed within a grace time, similarly to a case where the medium 22 is used. That is, unless the installation processing of the license is performed within the grace time since the electronic device 23 has transmitted the device information file to the smartphone 601, the license is not installed, and needs to be re-issued.

Furthermore, for example, short-range wireless communication such as Bluetooth (registered trademark), near field communication (NFC), and the like may be used as communication between the electronic device 23 and the smartphone 601. Therefore, it becomes possible for the server 11 and the electronic device 23 to directly communicate with each other via the smartphone 601. However, in this case, the electronic device 23 needs to support the short-range wireless communication.

Moreover, an example in which the installation of the license is prohibited and the license is re-acquired and installed in a case where the installation of the license in the electronic device 23 is not performed within a predetermined grace time has been described in the above description. On the other hand, for example, the installation of the license may be permitted even after a lapse of the grace time. For example, in step S66 of FIG. 15, in a case where it is determined that the interval between the device RTC and the current date and time is equal to or longer than the grace time, the processing proceeds to step S70, and the license may be immediately activated in step S70. Note that in this case, for example, an effective term of the license is shortened by a lapse time of the grace time.

Furthermore, the formats of the installation keys of FIGS. 14A, 14B, and 14C are examples, and can be appropriately changed. For example, some of the data included in the installation key are not stored in the installation key, and may be stored in a file such as the license communication file or the like for transmitting the installation key.

Moreover, an example in which the information is transmitted and received mainly in a file format between the server 11 and the client 21 has been described in the above description, but any other format can also be used as a format of information to be transmitted and received.

3. Others

<Configuration Example of Computer>

The series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 26:
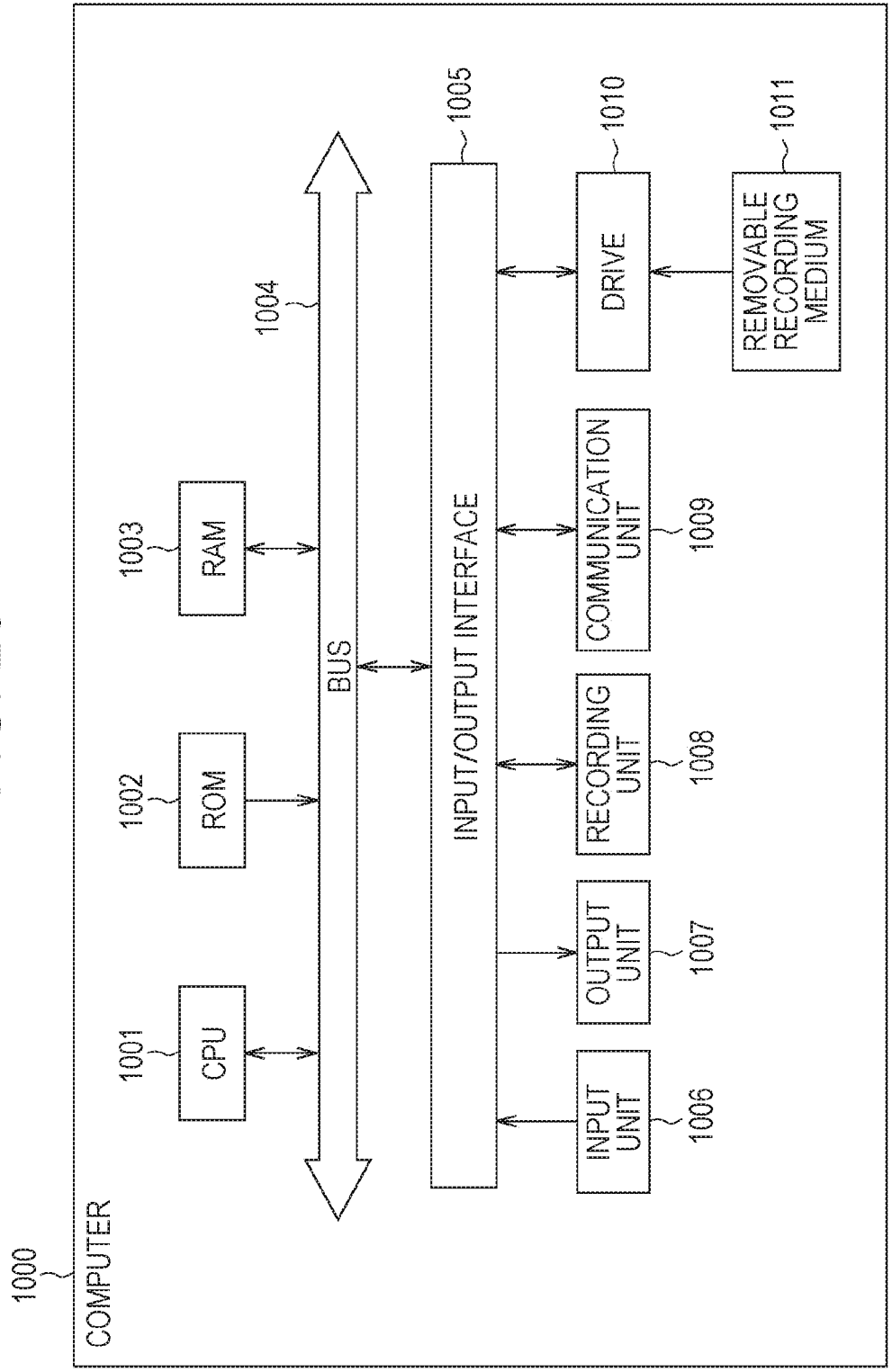
FIG. 26 is a diagram illustrating a configuration example of a computer.

FIG. 26 is a block diagram illustrating a configuration example of hardware of a computer that executes the series of processing described above by a program.

In the computer 1000, a central processing unit (CPU) 1001, a read only memory (ROM) 1002, and a random access memory (RAM) 1003 are connected to each other by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, a semiconductor memory, or the like.

In the computer 1000 configured as described above, the CPU 1001 performs the series of processing described above by loading, for example, a program recorded in the recording unit 1008 into the RAM 1003 via the input/output interface 1005 and the bus 1004 and executing the program.

The program executed by the computer 1000 (CPU 1001) can be provided by being recorded on the removable recording medium 1011 as, for example, a package medium and the like. Furthermore, the program can be provided via a wired or wireless transmission medium such as a local area network, the Internet, or digital satellite broadcasting.

In the computer 1000, the program can be installed in the recording unit 1008 via the input/output interface 1005 by mounting the removable recording medium 1011 on the drive 1010. Furthermore, the program can be received by the communication unit 1009 via the wired or wireless transmission medium and be installed in the recording unit 1008. In addition, the program can be installed in the ROM 1002 or the recording unit 1008 in advance.

Note that the program executed by the computer may be a program by which processing is performed in time series according to the order described in the present specification or may be a program by which processing is performed in parallel or at a necessary timing such as a timing when a call is made, or the like.

Furthermore, in the present specification, the system means a set of a plurality of components (apparatuses, modules (parts), or the like), and it does not matter whether or not all the components are in the same housing. Therefore, both of a plurality of apparatuses housed in separate housings and connected to each other via a network and one apparatus in which a plurality of modules is housed in one housing are systems.

Moreover, the embodiment of the present technology is not limited to the embodiment described above, and various modifications can be made without departing from the scope of the present technology.

For example, the present technology can have a configuration of cloud computing in which one function is shared and jointly processed by a plurality of apparatuses via a network.

Furthermore, the respective steps described in the above-mentioned flowcharts can be executed by one apparatus or can be executed in a shared manner by a plurality of apparatuses.

Moreover, in a case where a plurality of processing is included in one step, the plurality of processing included in one step can be executed by one apparatus or can be executed in a shared manner by a plurality of apparatuses.

<Combination Example of Configuration>

The present technology can also adopt the following configuration.

(1)

An information processing apparatus including:

a data generation unit that generates first license communication information using first device information, the first device information being information including a first reference date and time and a device unique key, the first reference date and time being a date and time set using a hardware clock of an electronic device and being a date and time used for period management of a license, the device unique key being a key unique to the electronic device, and the first license communication information being information including at least one of an effective term or an expiration time of the license and the first reference date and time and used for installing the license in the electronic device.

(2)

The information processing apparatus according to the above (1), further including a license management unit that sets the expiration time on the basis of the first reference date and time.

(3)

The information processing apparatus according to the above (1) or (2), further including a communication control unit that controls reception of the first device information from another information processing apparatus that transmits the first device information stored in a removable medium by the electronic device.

(4)

The information processing apparatus according to the above (3), in which the communication control unit controls transmission of the first license communication information to the another information processing apparatus.

(5)

The information processing apparatus according to any one of the above (1) to (4), in which the first license communication information includes an installation key for installing the license, and the data generation unit further generates second license communication information using second device information, the second device information being information including a second reference date and time, the device unique key, and the installation key, the second reference date and time being a date and time set using the hardware clock and being a date and time used for period management of a re-issue license, the re-issue license being the license to be re-issued, the second license communication information being information including at least one of an effective term or an expiration time of the re-issue license and the second reference date and time and used for installing the re-issue license in the electronic device.

(6)
The information processing apparatus according to any one of the above (1) to (5),
in which the data generation unit secures security of the first license communication information using the device unique key.

(7)
The information processing apparatus according to the above (6),
in which the data generation unit calculates a hash value of data in the first license communication information using the device unique key, and stores the hash value in the first license communication information.

(8)
The information processing apparatus according to any one of the above (1) to (7),
in which the first license communication information includes a device unique ID that is an ID unique to the electronic device.

(9)
An information processing method including:
generating, by an information processing apparatus, license communication information using device information, the device information being information including a reference date and time and a device unique key, the reference date and time being a date and time set using a hardware clock of an electronic device and being a date and time used for period management of a license, the device unique key being a key unique to the electronic device, and the license communication information being information including at least one of an effective term or an expiration time of the license and the reference date and time and used for installing the license in the electronic device.

(10)
A program for causing a computer to execute processing for:
generating license communication information using device information, the device information being information including a reference date and time and a device unique key, the reference date and time being a date and time set using a hardware clock of an electronic device and being a date and time used for period management of a license, the device unique key being a key unique to the electronic device, and the license communication information being information including at least one of an effective term or an expiration time of the license and the reference date and time and used for installing the license in the electronic device.

(11)
An electronic device including:
a hardware clock; and
a data generation unit that generates first device information that is information including a first reference date and time and a device unique key and used for issuing a license in a first information processing apparatus, the first reference date and time being a date and time set using the hardware clock and being a date and time used for period management of the license provided by the first information processing apparatus, and the device unique key being a key unique to every device.

(12)
The electronic device according to the above (11), further including
a license management unit that installs the license using license communication information, the license communication information being information including at least one of an effective term or an expiration time of the license and the first reference date and time and generated using the first device information by the first information processing apparatus.

(13)
The electronic device according to the above (12),
in which the license management unit manages a period of the license on the basis of at least one of the effective term or the expiration time, the first reference date and time, and a date and time of the hardware clock.

(14)
The electronic device according to the above (13),
in which the license management unit deactivates the license in a case where the hardware clock has been in an unset status.

(15)
The electronic device according to any one of the above (12) to (14),
in which the license management unit installs the license in a case where the first reference date and time in the license communication information is on and after a date and time earlier than a current date and time of the hardware clock by a predetermined grace time and is before the current date and time of the hardware clock.

(16)
The electronic device according to any one of the above (12) to (15),
in which a second information processing apparatus receives the license communication information from the first information processing apparatus and stores the license communication information in a removable medium, and
the license management unit acquires the license communication information from the removable medium.

(17)
The electronic device according to any one of the above (12) to (16),
in which the license communication information includes an installation key for installing the license, and
the data generation unit further generates second device information that is information including a second reference date and time, the device unique key, and the installation key and used for re-issuing the license in the first information processing apparatus, the second reference date and time being a date and time set using the hardware clock and being a date and time used for period management of the license to be re-issued.

(18)
The electronic device according to any one of the above (11) to (17), in which the data generation unit sets a date and time of the hardware clock when generating the first device information as the first reference date and time.

(19)
The electronic device according to any one of the above (11) to (18), further including
a key generation unit that generates the device unique key before generating the first device information for the first time.

(20)
The electronic device according to any one of the above (11) to (19),
in which the data generation unit secures security of the first device information using the device unique key.

(21)
The electronic device according to the above (20),
in which the data generation unit calculates a hash value of data in the first device information using the device unique key, and stores the hash value in the first device information.

(22)
The electronic device according to any one of the above (11) to (21),
in which the data generation unit stores the first device information in a removable medium, and
a second information processing apparatus transmits the first device information stored in the removable medium to the first information processing apparatus.

(23)
An information processing method including:
generating, by an electronic device including a hardware clock, device information that is information including a reference date and time and a device unique key and used for issuing a license in an information processing apparatus, the reference date and time being a date and time set using the hardware clock and being a date and time used for period management of the license provided by the information processing apparatus, and the device unique key being a key unique to the electronic device.

(24)
A program for causing a computer of an electronic device including a hardware clock to execute processing for:
generating device information that is information including a reference date and time and a device unique key and used for issuing a license in an information processing apparatus, the reference date and time being a date and time set using the hardware clock and being a date and time used for period management of the license provided by the information processing apparatus, and the device unique key being a key unique to the electronic device.

(25)
An information processing system including:
an electronic device that includes a hardware clock;
a first information processing apparatus; and
a second information processing apparatus,
in which the electronic device generates device information that is information including a reference date and time and a device unique key, the reference date and time being a date and time set using the hardware clock and a date and time used for period management of a license, and the device unique key being a key unique to the electronic device,
the first information processing apparatus transmits the device information to the second information processing apparatus,
the second information processing apparatus receives the device information from the first information processing apparatus, generates license communication information that is information including at least one of an effective term or an expiration time of the license and the reference date and time using the device information, and transmits the license communication information to the first information processing apparatus,
the first information processing apparatus receives the license communication information from the second information processing apparatus, and
the electronic device installs the license using the license communication information.

Note that effects described in the present specification are merely examples and are not limited, and other effects may be provided.

REFERENCE SIGNS LIST

10 Information processing system
11 Server
12 Client
13 Network
21 PC
22 Removable medium
23 Electronic device
102 Control unit
105 RTC
151 License management unit
152 Data generation unit
153 UI control unit
154 Communication control unit
155 Storage control unit
202 Function execution unit
203 Control unit
206 RTC
208 Drive
251 License management unit
252 Key generation unit
253 Data generation unit
254 UI control unit
255 Communication control unit
256 Storage control unit

The invention claimed is:
1. A first information processing apparatus, comprising:
circuitry configured to:
generate first license communication information using first device information;
calculate a hash value of data in the first license communication information using a device unique key, wherein
the first device information is information including a first reference date and time, a device unique key, the hash value, and the data in the first license communication information,
the first reference date and time is a date and time set using a hardware clock of a first electronic device and is a date and time used for period management of a license,
the device unique key is a key unique to the first electronic device, and
the first license communication information is information including at least one of an effective term or an expiration time of the license and the first reference date and time;
transmit the first device information to a server;

request re-issuance of the license based on the transmitted first device information; and
receive a license communication file based on the requested re-issuance of the license, wherein the received license communication file includes an installation key for installation of the license in a second electronic device.

2. The first information processing apparatus according to claim 1, wherein the circuitry is further configured to set the expiration time based on the first reference date and time.

3. The first information processing apparatus according to claim 1, wherein the circuitry is further configured to control reception of the first device information from a second information processing apparatus that transmits the first device information stored in a removable medium by the first electronic device.

4. The first information processing apparatus according to claim 3, wherein the circuitry is further configured to control transmission of the first license communication information to the second information processing apparatus.

5. The first information processing apparatus according to claim 1, wherein
the first license communication information includes the installation key for installation of the license, and
the circuitry is further configured to:
generate second license communication information using second device information, wherein
the second device information is information including a second reference date and time, the device unique key, and the installation key,
the second reference date and time is a date and time set using the hardware clock and is a date and time used for period management of the re-issue license,
the re-issue license is the license to be re-issued,
the second license communication information is information including at least one of an effective term or an expiration time of the re-issue license and the second reference date and time, and
the second license communication information is used for installation of the re-issue license in the first electronic device.

6. The first information processing apparatus according to claim 1, wherein the circuitry is further configured to secure the first license communication information using the device unique key.

7. The first information processing apparatus according to claim 6, wherein the circuitry is further configured to store the hash value in the first license communication information.

8. The first information processing apparatus according to claim 1, wherein the first license communication information includes a device unique identification (ID) that is an ID unique to the first electronic device.

9. An information processing method, comprising:
by an information processing apparatus:
generating license communication information using device information;
calculating a hash value of data in the license communication information using a device unique key, wherein
the device information is information including a reference date and time, a device unique key, the hash value, and the data in the license communication information,
the reference date and time is a date and time set using a hardware clock of a first electronic device and is a date and time used for period management of a license,
the device unique key is a key unique to the first electronic device, and
the license communication information is information including at least one of an effective term or an expiration time of the license and the reference date and time; and
transmitting the device information to a server;
requesting re-issuance of the license based on the transmitted device information; and
receiving a license communication file based on the requested re-issuance of the license, wherein the received license communication file includes an installation key for installation of the license in a second electronic device.

10. A non-transitory computer-readable medium having stored thereon computer-executable instructions that, when executed by a processor, cause the processor to execute operations, the operations comprising:
generating license communication information using device information;
calculating a hash value of data in the license communication information using a device unique key, wherein
the device information is information including a reference date and time, a device unique key, the hash value, and the data in the license communication information,
the reference date and time is a date and time set using a hardware clock of a first electronic device and is a date and time used for period management of a license,
the device unique key is a key unique to the first electronic device, and
the license communication information is information including at least one of an effective term or an expiration time of the license and the reference date and time, and
transmitting the device information to a server;
requesting re-issuance of the license based on the transmitted device information; and
receiving a license communication file based on the requested re-issuance of the license, wherein the received license communication file includes an installation key
the license communication information is used for installation of the license in a second electronic device.

11. A first electronic device, comprising:
a hardware clock; and
circuitry configured to:
generate first device information that is information including a first reference date and time, a device unique key, a hash value of data in a first license communication information and used for issuance of a license in a first information processing apparatus, wherein
the first reference date and time is a date and time set using the hardware clock and is a date and time used for period management of the license provided by the first information processing apparatus, and
the device unique key is a key unique to every device;
transmit the first device information to a server;

request re-issuance of the license based on the transmitted first device information; and receive a license communication file based on the requested re-issuance of the license, wherein the received license communication file includes an installation key for installation of the license to a second electronic device.

12. The first electronic device according to claim 11, wherein the circuitry is further configured to control the installation of the license using the license communication information, wherein
the license communication information is information including at least one of an effective term or an expiration time of the license and the first reference date and time, and
the license communication information is generated using the first device information by the first information processing apparatus.

13. The first electronic device according to claim 12, wherein the circuitry is further configured to manage a period of the license based on at least one of the effective term or the expiration time, the first reference date and time, and a date and time of the hardware clock.

14. The first electronic device according to claim 13, wherein the circuitry is further configured to deactivate the license based on a determination that the hardware clock is in an unset status.

15. The first electronic device according to claim 12, wherein the circuitry is further configured to install the license based on a determination that the first reference date and time in the license communication information is on and after a date and time earlier than a current date and time of the hardware clock by a specific grace time and is before the current date and time of the hardware clock.

16. The first electronic device according to claim 12, wherein
a second information processing apparatus is further configured to:
receive the license communication information from the first information processing apparatus; and
store the license communication information in a removable medium, and
the circuitry is further configured to acquire the license communication information from the removable medium.

17. The first electronic device according to claim 12, wherein
the license communication information includes an installation key for installation of the license, and
the circuitry is further configured to generate second device information that is information including a second reference date and time, the device unique key, and the installation key, wherein
the second device information is used for re-issuance of the license in the first information processing apparatus, and
the second reference date and time is a date and time set using the hardware clock and is a date and time used for period management of the license to be re-issued.

18. The first electronic device according to claim 11, wherein the circuitry is further configured to set a date and time of the hardware clock while generation of the first device information as the first reference date and time.

19. The first electronic device according to claim 11, wherein the circuitry is further configured to generate the device unique key before generation of the first device information for a first time.

20. The first electronic device according to claim 11, wherein the circuitry is further configured to secure the first device information using the device unique key.

21. The first electronic device according to claim 20, wherein the circuitry is further configured to:
store the hash value in the first device information.

22. The first electronic device according to claim 11, wherein
the circuitry is further configured to store the first device information in a removable medium, and
a second information processing apparatus is further configured to transmit the first device information stored in the removable medium to the first information processing apparatus.

23. An information processing method, comprising:
a first electronic device including a hardware clock:
generating device information that is information including a reference date and time, a device unique key, a hash value of data in a license communication information and used for issuance of a license in an information processing apparatus, wherein
the reference date and time is a date and time set using the hardware clock and is a date and time used for period management of the license provided by the information processing apparatus, and
the device unique key is a key unique to the first electronic device;
transmitting the device information to a server;
requesting re-issuance of the license based on the transmitted device information; and
receiving a license communication file based on the requested re-issuance of the license, wherein the received license communication file includes an installation key for installation of the license.

24. A non-transitory computer-readable medium having stored thereon computer-executable instructions that, when executed by a processor, cause the processor to execute operations, the operations comprising:
generating device information that is information including a reference date and time, a device unique key, a hash value of data in a license communication information, wherein
the device information is used for issuance of a license in an information processing apparatus,
the reference date and time is a date and time set using a hardware clock of a first electronic device and is the date and time used for period management of the license provided by the information processing apparatus, and
the device unique key is a key unique to the first electronic device;
transmitting the device information to a server;
requesting re-issuance of the license based on the transmitted device information; and
receiving a license communication file based on the requested re-issuance of the license, wherein the received license communication file includes an installation key for installation of the license in a second electronic device.

25. An information processing system, comprising:
a first electronic device that includes a hardware clock;
a first information processing apparatus; and
a second information processing apparatus, wherein
the first electronic device is configured to generate device information that is information including a reference date and time and a device unique key, the reference date and time is a date and time set using the hardware clock and is a date and time used for period management of a license, the device unique key is a key unique to the first electronic device, the first information processing apparatus is configured to transmit the device information to the second information processing apparatus, and the second information processing apparatus is configured to:
    receive the device information from the first information processing apparatus,
    generate license communication information that is information including at least one of an effective term or an expiration time of the license and the reference date and time using the device information, and
    transmit the license communication information to the first information processing apparatus, the first information processing apparatus is further configured to:
    receive the license communication information from the second information processing apparatus,
    calculate a hash value of data in the license communication information using the device unique key, wherein the device information further includes the hash value and the data in the license communication information;
    request re-issuance of the license based on the received device information;
    receive a license communication file based on the requested re-issuance of the license, wherein the received license communication file includes an installation key; and
    a second electronic device is configured to install the license using the installation key.

26. The first information processing apparatus according to claim 1, wherein the circuitry is further configured to:
calculate the hash value of the data in the first license communication information using the device unique key;
encrypt the calculated hash value using a server secret key; and
generate a signature based on the encrypted hash value.

27. A first information processing apparatus, comprising:
circuitry configured to:
    generate first license communication information using first device information, wherein
        the first device information is information including a first reference date and time and a device unique key,
        the first reference date and time is a date and time set using a hardware clock of an electronic device and is a date and time used for period management of a license,
        the device unique key is a key unique to the electronic device, and
        the first license communication information is information including at least one of an effective term or an expiration time of the license and the first reference date and time;
    calculate a hash value of data in the first license communication information using the device unique key;
    encrypt the calculated hash value using a server secret key;
    generate a signature based on the encrypted hash value; and
    generate a license communication file based on the data and the generated signature, wherein the first license communication information and the license communication file are used for installation of the license in the electronic device.

* * * * *